US010507839B2

(12) United States Patent
Altmannshofer et al.

(10) Patent No.: US 10,507,839 B2
(45) Date of Patent: Dec. 17, 2019

(54) DRIVING ASSISTANCE APPARATUS WITH HUMAN MACHINE INTERFACE SYSTEM

(71) Applicant: Hitachi, Ltd., Chiyoda-ku, Tokyo (JP)

(72) Inventors: Heiko Altmannshofer, Dorfen (DE); Junya Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 146 days.

(21) Appl. No.: 15/826,071

(22) Filed: Nov. 29, 2017

(65) Prior Publication Data

US 2018/0162409 A1 Jun. 14, 2018

(30) Foreign Application Priority Data

Dec. 12, 2016 (EP) ..................................... 16203495

(51) Int. Cl.
| B60W 40/105 | (2012.01) |
| B60W 50/08 | (2012.01) |
| B60W 50/14 | (2012.01) |
| G08G 1/095 | (2006.01) |
| G08G 1/0967 | (2006.01) |

(52) U.S. Cl.
CPC ........ *B60W 40/105* (2013.01); *B60W 50/085* (2013.01); *B60W 50/14* (2013.01); *G08G 1/095* (2013.01); *G08G 1/096708* (2013.01); *B60W 2050/146* (2013.01); *B60W 2420/42* (2013.01); *B60W 2550/22* (2013.01)

(58) Field of Classification Search
None
See application file for complete search history.

(56) References Cited

U.S. PATENT DOCUMENTS

| 2011/0095906 | A1 | 4/2011 | Stählin |
| 2013/0110371 | A1 | 5/2013 | Ogawa |
| 2016/0272113 | A1* | 9/2016 | Lopez-Hinojosa ..... H04W 4/90 |
| 2018/0032072 | A1* | 2/2018 | Hoye ................... G05D 1/0061 |
| 2018/0350230 | A1* | 12/2018 | Kienitz ................ G08G 1/0112 |

(Continued)

FOREIGN PATENT DOCUMENTS

| JP | 8-329384 A | 12/1996 |
| JP | 2003-39975 A | 2/2003 |
| JP | 2009-104544 A | 5/2009 |

(Continued)

OTHER PUBLICATIONS

Japanese-language Office Action issued in counterpart Japanese Application No. 2017-215480 dated Sep. 25, 2018 with English translation (eight (8) pages).

*Primary Examiner* — Richard M Camby
(74) *Attorney, Agent, or Firm* — Crowell & Moring LLP

(57) ABSTRACT

An apparatus and method for controlling a vehicle is proposed. Detection of a traffic light along the trajectory of a cruising vehicle and a determination of current and future traffic light statuses is performed. It is determined whether the vehicle can arrive at the traffic light during a passing status in accordance with an adaptation of the kinematic vehicle state. Signals are provided via a human 10 machine interface corresponding to various kinematic vehicle state adaptation scenarios in order to enable an arrival at the traffic light during a passing status. In response to the respective human machine interface signals, control of the vehicle can be performed accordingly.

13 Claims, 7 Drawing Sheets

(56) References Cited

U.S. PATENT DOCUMENTS

2019/0096248 A1* 3/2019 Liu .................... G08G 1/09623

FOREIGN PATENT DOCUMENTS

| JP | 2012-27779 A | 2/2012 |
| JP | 2012-38082 A | 2/2012 |
| JP | 2013-97621 A | 5/2013 |
| JP | 2014-7895 A | 1/2014 |
| JP | 2014-32544 A | 2/2014 |

* cited by examiner

DRIVING ASSISTANCE APPARATUS WITH HUMAN MACHINE INTERFACE SYSTEM

The present disclosure relates to an apparatus and method for controlling a vehicle, and in particular to a semi-automatic or an automatic driving system for supporting and facilitating driving control of a vehicle.

BACKGROUND

Driver assistance systems, are designed to help a driver of a vehicle (e.g. car or motorcycle) in the driving process. In combination with a human machine interface, driver assistance systems enable an increase of car safety and road safety. In general, driver assistance systems enable to automate/adapt/enhance vehicles for safety and better driving. Safety features can be implemented to avoid collisions and accidents by offering applications that alert a vehicle driver to potential sources of danger during traveling. In addition, driver assistance systems can be configured to enable or implement safeguards and/or take over control of the vehicle partially. For example, speed adaptation systems can ensure that vehicle speed does not exceed a safe or legally enforced speed. In case of potential speeding, a human driver can be alerted to reduce the speed. Alerting a vehicle driver's attention can be performed via human machine interfaces.

A human machine interface enables interactions between humans and machines in order to allow effective operation and control of the machine from the human end, wherein the machine provides information in order to aid the user in a decision-making process. US 2011/0095906 A1 relates to a method and device for controlling traffic flow for this purpose.

SUMMARY in view of the above, this present disclosure describes application of a driving assist system providing driving condition recommendation or kinematic state control of a vehicle approaching a traffic light.

It is an object to propose aspects and methods for an automatic driving system that improves traffic flow and enables reduction of traffic jams while ensuring safety of vehicle passengers as well as other road users.

According to some embodiments, for solving the above-mentioned technical object, there is a proposed apparatus for controlling a vehicle and a method for controlling a vehicle.

Also, there is proposed a computer program product, adapted to cause a computer or computer system, preferably a vehicle controller, to perform an automatic vehicle control. Dependent claims and the combinations of two or more dependent claims relate to exemplary and preferred embodiments.

In the most preferable aspects, the embodiments shall be applied to vehicles being operated in road traffic, such as cars, trucks or motorcycles. However, it is to be noted that the aspects and embodiments may also be applied to different fields, such as handling of vehicles in construction or mining operations. Furthermore, application of some of the aspects and embodiments can also be implemented in nautical environments, e.g. in the control of motorboats.

In the following, support for features and aspects of the exemplary embodiments will be given, and advantages will be described. Further advantages and features may become apparent from the later more detailed description of drawings and related exemplary embodiments.

According to an aspect, an apparatus for controlling a vehicle may be provided, wherein the apparatus for controlling a vehicle may comprise a traffic light detection unit. In some embodiments, the traffic light detection unit may be configured to determine whether the vehicle is approaching a traffic light.

For example, the apparatus for controlling a vehicle may be a moving node of a communication system and the traffic light may be a stationary node of the communication system. In particular, moving nodes and stationary nodes may be part of a vehicular ad hoc communication network (VANET). VANETs utilize the principles of mobile ad hoc networks (MANET), which are continuously self-configuring networks of mobile devices connected wirelessly.

VANETs may use any wireless network technology as basis. For example, short range radio technologies like WLAN may be utilized. In addition, also cellular technologies can be used. By utilizing positional information (e.g. obtained via global positioning system data) indicating the locations of the movable node (vehicle) and the stationary node (traffic light) respectively, the traffic light detection unit may determine whether the vehicle is approaching a traffic light.

Moreover, the traffic light detection unit may be further configured to determine a position of a traffic light utilizing sensors capable of processing a diverse range of signals including sonar, radar or optical signals and to determine the position of a traffic light in relation to the vehicle position. In addition, in some embodiments the traffic light detection unit may comprise devices capable of emitting sonar, radar or optical signals. Furthermore, in some embodiments the traffic light detection unit may be configured to utilize global navigation satellite system (GNSS) information or data in order to determine a traffic light position.

This provides the advantage that the traffic light detection unit may be configured to actively and/or passively determine, whether the vehicle is approaching a traffic light in combination with an exact position determination of the traffic light in relation to the approaching vehicle.

In particular, a passive determination comprises reception of signals emitted, e.g. by a traffic light, indicating the location or position of the traffic light (e.g. Via VANET). An active determination comprises probing the proximity of the vehicle for traffic lights via probing means, receiving probing data and analyzing such data for information indicating the existence of a traffic light.

Therefore, the traffic light detection unit is enabled to anticipate and predict the locations of traffic lights and improve the detection of a traffic light. This provides means for facilitating anticipation of the occurrence of traffic lights at, e.g. wrote intersections, which is advantageous for the improvement of passenger safety of vehicle as well as other traffic participants.

In some embodiments, the traffic light detection unit can be further configured to detect failure conditions, such as visual obstructions of the traffic light or false positives such as those induced by other light sources, e.g. brake lights of other vehicles or particular patterns of light on objects such as trees, buildings or brightly lit billboards. This provides the advantage of improving accuracy or reliability of traffic light detection.

In some embodiments, the apparatus for controlling a vehicle may comprise an arrival time estimation unit. Preferably, the arrival time estimation unit may be configured to estimate a first arrival time of the vehicle at the traffic light, when the vehicle is detected to approach a traffic light. In other words, when it is detected by the traffic light detection unit, that the vehicle approaches a traffic light, the arrival time estimation unit may be configured to determine a point in time (first arrival time), at which arrival of the vehicle at the traffic light is expected.

In some embodiments, the arrival time estimation unit may be configured to determine or estimate the first arrival time of the vehicle at the traffic light based on current driving conditions. In other words, the arrival time estimation unit may be configured to utilize information indicating a current kinematic state of the vehicle and distance between the vehicle and the detected traffic light to calculate an estimated first arrival time of the vehicle at the traffic light. This provides the advantage of precisely estimating arrival times at, e.g. road intersections or junctions, which serves to improve driving safety. For example, advanced warning of a traffic light signal located ahead of the vehicle, provides an additional safety buffer concerning potentially necessary breaking and/or acceleration maneuvers of the vehicle. Consequently, traffic safety may be further improved Moreover, in some embodiments the arrival time estimation unit may be further configured to estimate a second arrival time of the vehicle at the traffic light based on adapted driving conditions. The adapted driving conditions may be different from the current driving conditions.

Thus, the arrival time estimation unit may be configured to utilize information corresponding to a change of the current kinematic state of the vehicle and to calculate an estimated second arrival time of the vehicle at the traffic light based upon the information corresponding to the current kinematic state change of the vehicle. The change of the current kinematic state of the vehicle may vary within a predetermined range indicated by kinematic parameters such as velocity and acceleration of the vehicle. Specifically, the change of the current driving conditions may be caused by an increase or decrease of vehicle velocity caused by an acceleration or deceleration of the vehicle. For example, current driving conditions might corresponds to a kinematic state of the vehicle, wherein the vehicle drives at a constant velocity in accordance with traffic laws or regulations. In other words, current driving conditions might indicate a uniform translation motion of the vehicle. Alternatively, however, current driving state may also refer to a kinematic state of the vehicle, wherein the velocity is uniformly changed in accordance with acceleration or deceleration of the vehicle. Hence, an alternative, i.e. second, arrival time may be estimated, which provides improved information relating to anticipation of traffic lights located ahead of the vehicle. Consequently, traffic flow and driving safety as well as safety of other traffic distance may be further enhanced.

In some embodiments, the apparatus for controlling a vehicle may comprise a traffic light status determination unit. The traffic light status determination unit may be configured to determine a traffic light status of the traffic light at the first arrival time. Furthermore, the traffic light status determination unit may be configured to determine a traffic light status of the traffic light at the second arrival time. In other words, the traffic light status determination unit may be configured to calculate a particular traffic light status of the traffic light at the first and second arrival times. Accordingly, such an anticipation of a particular traffic light status within a determined arrival time of the vehicle at the traffic light enables adaptation vehicle driving behavior in accordance with an expected traffic light phase. This provides, for example, an optional adaptation of vehicle driving behavior. In other words, the traffic light may be approached such that no sudden acceleration and/or deceleration or even stopping maneuvers may be necessary. This further enhances traffic flow. Moreover, since unnecessary stopping incidents of the vehicle might be avoided, gasoline consumption might be decreased. Therefore, financial expenses as well as environmental impact of operating a vehicle might be reduced. In particular, $CO_2$ emissions during operation of the vehicle might be alleviated.

Preferably, the traffic light status determination unit may be configured to detect a particular state or phase of a traffic light that the vehicle is approaching. In other words, sensors comprised by the vehicle (i.e. the apparatus for controlling a vehicle) may be utilized in order to receive data which indicates a traffic light status, i.e. a specific light phase, at a first arrival time determined on the assumption of current driving conditions or at a second arrival time determined on the basis of an adaption of the current driving conditions. For example, sensors may detect light of a current and subsequent traffic light phases or statuses in addition to information related to the duration of the current light phase and subsequent light phase durations of the traffic light. The information concerning duration of the individual traffic light phases may be transmitted to the apparatus for controlling the vehicle by the traffic light upon request by the apparatus for controlling the vehicle or may be transmitted autonomously and continuously by the traffic light in accordance with current light phases of the traffic light and transitions between different traffic light phases.

However, in some embodiments, the information related to duration of traffic light phases may also be acquired solely based upon analysis of received optical signals from the traffic light in particular, optical sensors may be configured to probe the traffic light phases of and approached traffic light. For example, based upon a lapse time between changes of frequency of the detected light phase, i.e. the particular color corresponding to a traffic light phase, a duration for the respective traffic light phase may be determined by the traffic light status determination unit. Accordingly, it is possible to precisely determine a particular traffic light status at a projected (first) arrival time based upon current driving conditions as well as at another (second) estimated arrival time based upon adaptation of the current driving conditions. Consequently, fuel and/or energy efficiency, i.e. prevention of excessive gasoline and/or energy usage during vehicle operation may be further enhanced by providing potential for an adjustment of driving behavior in accordance with estimated traffic light phases.

In some embodiments, the traffic light status is a passing status that allows the vehicle to pass the traffic light. In other words, the determined traffic light status may be determined being a passing status allowing the vehicle to pass the traffic light. For example, a passing status may be defined as duration, wherein the traffic light is in a green light phase. In addition, a passing status may also comprise a yellow light phase only or a combination of green and yellow light phases. However, arbitrary sub-intervals of green, yellow or combined green and yellow light phases can be defined as passing status of a traffic light. In other words, arbitrary time interval lengths relating to green phase, yellow phase or a combination of green and yellow light phases of a traffic light may be defined as passing status of a traffic light.

Consequently, arrival of the vehicle at the traffic light may be aligned in accordance with a yellow and/or green light phase of the traffic light. Accordingly, traffic flow and traffic safety can be improved.

In some embodiments, the traffic light status may be a stopping status requiring the vehicle to stop at the traffic light. For example, a stopping status may be defined by the duration of the traffic light emitting red light, i.e. a red light phase. In addition, a stopping status may also comprise a yellow light phase only or a combination of red and yellow light phases. However, arbitrary sub-intervals of red, yellow or combined red and yellow light phases may be defined as stopping status of a traffic light. In other words, any time interval lengths relating to red, yellow or a combination of red and yellow light phases of the traffic light may be defined as stopping status of a traffic light.

Accordingly, arrival of the vehicle at the traffic light may be coordinated or aligned in correspondence to a determined red light phase, i.e. stopping status of and approached traffic light. Hence, traffic flow may be improved and unnecessary stopping processes of the vehicle may be avoided. Therefore, fuel and/or energy efficiency during vehicle operation can be increased and pollution, e.g. by $CO_2$-missions and/or exhaustion fumes, may be decreased.

In some embodiments, the apparatus for controlling a vehicle may comprise a processing unit. The processing unit may be configured to calculate whether the vehicle can pass the traffic light. The processing unit may comprise a central processing unit (CPU), a microprocessor, microcontroller, digital signal processor, or general purpose computer enabled for information processing and logical calculations.

In some embodiments, a calculation or determination of whether the vehicle can pass the traffic light may be based on the current driving conditions of the vehicle and based on a determination whether the traffic light as a passing status at the estimated first arrival time. In other words, subsequently to a determination of the current kinematic state of the vehicle, i.e. the current driving conditions of the vehicle, such as current velocity and/or acceleration, and subsequently to determining of information indicating the durations of current and future traffic light phases, the processing unit may calculate or determine whether the vehicle will arrive at the traffic light at the estimated first arrival time during a passing status. For example, information indicating duration, i.e. time length, of current and future light phases as well as distance between the vehicle and the detected traffic light, may be obtained via sensors. The information related to length of the respective traffic light phases may be, for example, received from the traffic light. In particular, the traffic light may transmit the duration-information upon request. On the other hand, the traffic light may transmit light phase duration-information continuously. Moreover, the apparatus for controlling the vehicle may autonomously determine duration of traffic light phases based upon information retrieved from an analysis of optical input, which may take into account color change, i.e. frequency change, of light emitted by the traffic light during a predetermined time interval. The distance between the vehicle and the traffic light might either be determined utilizing a global positioning system and/or any other means configured for distance measuring.

Hence, taking into account distance information between the vehicle and the traffic light as well as current driving conditions such as current velocity and/or acceleration of the vehicle, the processing unit may be enabled to calculate the vehicle trajectory. Consequently, the processing unit can determine whether the vehicle will pass the traffic light in accordance with current velocity and/or acceleration values of the vehicle, i.e. the current kinematic state of the vehicle.

In some embodiments, a calculation or determination of whether the vehicle can pass the traffic light may be based on adapted driving conditions of the vehicle and based on a determination whether the traffic light as a passing status at the estimated second arrival time. In other words, subsequently to a determination of the current vehicle velocity and/or acceleration, as well as distance between the vehicle and the traffic light, the processing unit may utilize information indicating durations of current and future traffic light phases to calculate, whether the vehicle will arrive at the traffic light at the estimated second arrival time during a passing status, when velocity and/or acceleration of the current kinematic vehicle state are adapted. In other words, the processing unit estimates or calculates a trajectory between the vehicle and a traffic light and determines whether the vehicle following the trajectory can arrive at the traffic light during a passing status at the second arrival time, when the current kinematic vehicle state is changed. Such a kinematic vehicle state change or adaption may be achieved via an increase or decrease of current velocity and/or acceleration of the vehicle. In other words, an adaptation of the current kinematic vehicle state may be obtained via a change of kinematic parameters such as velocity and acceleration.

This determination process may be performed in analogy to the determination whether the vehicle will arrive at the traffic light at the first arrival time during a passing status based on current driving conditions. To be more precise, information relating to distance between the vehicle and the traffic light as well as duration of different light phases may be analyzed and processed in order to determine, whether an adaptation of the current driving conditions enables the vehicle to arrive at the second arrival time at the traffic light during a passing status.

Moreover, the determination whether the vehicle can pass the traffic light based on adapted driving conditions of the vehicle may be performed by the processing unit simultaneously or in parallel to the determination, whether the vehicle can pass the traffic light based on current driving conditions of the vehicle.

In other words, the processing unit may be configured to perform at least two calculation steps in parallel. In a first calculation step, the processing unit may be configured to determine whether the vehicle will arrive within a yellow or green phase of the traffic light under the assumption of determined current driving conditions.

In a second calculation step, performed in parallel to the first calculation step, the processing unit may configured to determine, whether the vehicle will be enabled to arrive within a yellow or green phase of the traffic light under the assumption of a kinematic state, which may be characterized by an adaptation of the current driving conditions. Moreover, the processing unit may also determine the exact amount of adaption that is necessary in order to arrive at the traffic light during or at a passing status. In other words, the processing units may be configured to exactly calculate the amount of acceleration or velocity increase and/or decrease of the vehicle, that is necessary to arrive at a passing status upon arrival at the traffic light at the second estimated arrival time.

Accordingly, a precise estimate of vehicle arrival times at detected traffic lights is enabled. Accordingly, driving behavior of the vehicle may be adapted or adjusted. This enables a more smooth traffic flow and improves traffic safety. Moreover, fuel and/or energy efficiency during vehicle operation may be improved and environmental impact, as well as financial costs of vehicle operation may be decreased. Moreover, deterioration of vital vehicle parts such as the braking system may be prevented or moderated.

In the following, preferred aspects and exemplary embodiments are described. Unless explicitly stated that different features or aspects represent pure alternatives that cannot be combined, it is to be understood that any two or more of the following aspects and features may be combined to form for embodiments, as long as such combinations lie within the scope of the independent claim(s).

In some preferred embodiments, the processing unit of the apparatus for controlling a vehicle, upon detection of the vehicle approaching the traffic light, may further be configured to determine whether the vehicle can pass the traffic light during the passing status at the estimated second arrival time when the current driving conditions are adapted based on first driving condition control settings, so as to pass the traffic light by control based on the first driving condition control settings.

Hence, the processing unit estimates or determines whether the vehicle, upon approaching a traffic light, may be enabled to arrive at or pass the traffic light during a passing status if respective first driving condition control settings are implemented. Preferably, the processing unit determines, based upon the distance between traffic light and vehicle, when the vehicle will arrive at the traffic light according to current driving conditions and calculates a necessary change or adaption of the current driving conditions, i.e. an increase or decrease of velocity and/or acceleration, in order to enable the vehicle to arrive at the estimated second arrival time at a passing state of the traffic light.

Change or adaption of the current driving conditions may be implemented according to first driving condition control settings or by manual override by a driver of the vehicle. In particular, the first driving condition control settings may be represented by a set of control parameters for vehicle control. The control parameters may be represented, e.g. by machine-readable information. For example, the control parameters may be represented by binary coded instructions/information.

Based upon a set of control parameters, the kinematic state of the vehicle, indicated by position, velocity and acceleration can be set or controlled.

More specifically, velocity and/or acceleration values of the vehicle corresponding to first driving condition control settings may be set in accordance with individual preferences of a vehicle driver. In particular, a range of kinematic values for vehicle acceleration and/or speed maybe suggested to a vehicle driver, whereupon the driver chooses or confirms the suggested values for acceleration and/or velocity of the vehicle, when they corresponds to his personal driving preferences. In other words, a vehicle driver may be provided with a set of acceleration and/or velocity values for the vehicle that corresponds to a driving behavior preventing excessive, i.e. too sporty, driving maneuvers.

Hence, the first driving condition control settings correspond to a regime of kinematic values such as velocity and/or acceleration, classifying a variety of kinematic vehicle states that are in accordance with a vehicle driving behavior that is perceived as comfortable by a vehicle driver. Consequently, according to acceleration and/or velocity values corresponding to first driving condition control settings, a vehicle driver experiences a comfortably exposure to acceleration forces (and/or speed perception) and perceives a "normal" driving behavior of the vehicle.

The kinematic state change of the vehicle may be achieved in accordance with the predetermined first driving condition control settings and may be implemented by a driver of the vehicle by manual override or performed automatically. In particular, actively changing the kinematic state of the vehicle may comprise changing velocity or acceleration of the vehicle by utilizing speeding and/or breaking means, e.g. a brake and/or gas pedal of the vehicle.

Preferably, upon detection of the vehicle approaching the traffic light, the processing unit is further configured to determine whether the vehicle can pass the traffic light during the passing status at the estimated second arrival time when the current driving conditions are adapted being controlled based on second driving condition control settings, so as to pass the traffic light by control based on the second driving condition control settings. In particular, the second driving condition control settings may be represented by another set (second set) of control parameters for vehicle control. The second set of control parameters may be represented, e.g. by machine-readable information. For example, the second set of control parameters may be represented by binary coded instructions/information.

Based upon the second set of control parameters, the kinematic state of the vehicle, indicated by position, velocity and acceleration can be set or controlled.

More specifically, velocity and/or acceleration values of the vehicle corresponding to second driving condition control settings may be set in accordance with individual preferences of a vehicle driver. In particular, another kinematic state range of the vehicle different from the kinematic state range of the vehicle according to the first driving condition control settings can be characterized in correspondence with the second driving condition control settings.

A kinematic state range may be defined by a regime of velocity and acceleration values, for example longitudinal and/or lateral acceleration values of the vehicle, within predefined number intervals. Such a number interval may be, e.g., chosen as ranging from 0 to 100 km/h for the speed value and −10 m/s$^2$ to +10 m/s$^2$. However, other number regimes may be chosen in accordance with the scope of this application.

In particular, in correspondence to the first driving condition control settings the second driving condition control settings may be defined as set of machine-readable (binary) instructions for vehicle control in accordance with a regime of acceleration and/or velocity values, wherein the vehicle driver may be exposed to acceleration forces (and/or speed perception) that are in accordance with a predetermined kinematic state range corresponding to individual vehicle driver tolerances. Specifically, the second driving condition control settings correspond to control parameters for vehicle control, wherein, e.g., acceleration exposure and/or speed perception of the vehicle driver are no longer perceived as comfortably but merely as tolerable or acceptable, i.e "more sporty".

In other words, the second driving condition control settings may be defined in interplay with the first driving condition control settings such that exceeding of acceleration and/or speed values in accordance with control parameters defining the first driving condition control settings may be defined as a kinematic vehicle state in accordance with control parameters defining the second driving condition control settings.

The kinematic state change of the vehicle in accordance with the second driving condition control settings may be implemented by a driver of the vehicle by manual override. In particular, manual override may comprise actively changing the kinematic state of the vehicle, i.e. changing velocity or acceleration of the vehicle, utilizing speeding and/or braking means, i.e. brake and flash or gas pedal, of the vehicle.

Moreover, the difference or gradient between current driving conditions and adapted driving conditions according to first and second driving condition control settings may vary considerably. In other words, the difference between the current driving conditions of the vehicle and adapted driving conditions according to second driving condition control settings may be much more expressed, i.e. larger, then the difference between the current driving conditions of the vehicle and adapted driving conditions according to the first driving condition control settings.

In other words, acceleration and/or speed variation may be much more drastically during adaptation of current driving conditions according to second driving condition control settings then according to first driving condition control settings. For example, an adaptation of the current driving conditions according to second driving condition control settings may involve or require much higher acceleration values than a performed kinematic state adaptation in accordance to first driving condition control settings.

Moreover, the control parameters characterizing the first driving condition control settings may comprise the case, wherein, upon vehicle control, no adaptation of the current driving conditions is implemented.

Hence, driving conditions of a vehicle may be accurately set in view of approaching a traffic light. Accordingly, the driving behavior of the vehicle can be adapted such that stopping the vehicle in front of the approach traffic light during a stopping phase, i.e. red or yellow light phase of the traffic light, can be avoided. Consequently, the present invention contributes to prevent traffic jams and improves traffic flow. Therefore, excessive usage of gasoline or fuel and/or energy during operation of the vehicle can be avoided. Accordingly, cost efficiency of operating a vehicle is improved and exhaustion fumes of the vehicle are decreased.

In some preferred embodiments, the apparatus for controlling a vehicle may further comprise a control unit (controller). Preferably, the control unit may be configured to control a driving direction of the vehicle. Furthermore, the control unit may be configured to control a speed of the vehicle. Moreover, the control unit may be further configured to control an acceleration of the vehicle. Preferably, control of the vehicle may be based on the first driving condition control settings.

In other words, preferably the control unit may be configured to control at least one of a driving direction of the vehicle, a speed of the vehicle and/or an acceleration of the vehicle based on first driving condition control settings.

Hence, semi-automatic, automatic or autonomous control of the vehicle via the control unit may be enabled, which improves traffic safety.

In some preferred embodiments, the control unit may be further configured to adapt the current driving conditions of the vehicle based on the first driving condition control settings.

Preferably, adaptation of the current driving conditions of the vehicle based on the first driving condition control settings may be performed, if the processing unit determined that the vehicle can pass the traffic light during the passing status when being controlled based on the first driving condition control settings, so as to pass the traffic light by control based on the first driving control settings.

Therefore, the control unit may be configured to change the kinematic state of the vehicle by adapting at least one of the vehicle's driving direction, velocity and/or acceleration or a combination thereof. Preferably, the adaptation of the kinematic vehicle state may be performed in accordance or based upon the first driving condition control settings. Consequently, upon a determination that the vehicle can pass the traffic light during a passing status, e.g. a green light phase or a yellow light phase of the traffic light, based upon first driving condition control settings, the vehicle may be controlled by the control unit such that acceleration and/or velocity values of the vehicle do not exceed a predetermined threshold. Therefore, a driver of the controlled vehicle will not perceive excessive speed values or experience uncomfortable acceleration values. Consequently, the vehicle driving behavior will be perceived by a driver as "comfortable".

Accordingly, passing of a traffic light during a green or yellow light phase is enabled without the need to exceed predetermined speed and/or acceleration values. Thus, a smooth traffic flow, in particular at busy intersections or crossroads, is enabled.

Preferably, the control unit may comprise a central processing unit (CPU) or microcontroller. As such, the control unit may be configured to direct operation of a computer processor. More precisely, the control unit may be a collection of complex digital circuitry interconnecting and controlling various elements comprised within a central processing unit such as data buffers, registers, etc.

In other words, the control unit may be configured to direct a computer and output devices connected with the computer to respond to program instructions stored on a memory that are directed towards automated vehicle control. Memory may refer to computer hardware devices use to store information for immediate use by the control unit. In other words, the center processing unit may directly access information/instructions stored in the memory.

In some preferred embodiments, the control unit may be further configured to adapt the current driving conditions of the vehicle based on the second driving condition control settings. Preferably, the control unit may enable an automatic adaptation of the current kinematic state of the vehicle. In other words, the control unit may perform change of the kinematic vehicle state according to instructions directed towards adaptation of kinematic parameters of the vehicle such as acceleration and/or velocity of the vehicle. The performed adaptation of the current vehicle driving conditions may be performed in accordance to the second driving condition control settings. Hence, adaptation of kinematic parameters such as acceleration and/or speed of the vehicle may exceed predefined threshold values that classify an individually perceived "comfortable driving behavior" of a vehicle driver. In other words, vehicle control implemented by the control unit may result in a more "sporty" driving behavior of the vehicle.

Consequently, the control unit may implement drastic changes or variations of the current vehicle driving conditions in accordance with the predefined second driving condition control settings. To put it differently, the implemented or performed adaptation of the current kinematic vehicle state via change of parameters such as speed and/or acceleration, may be large in comparison with an adaptation in accordance with first driving condition control settings.

In some preferred embodiments, the current driving conditions of the vehicle may be adapted based on the second driving condition control settings, if the processing unit determined that the vehicle cannot pass the traffic light during the passing status at the estimated second arrival time when being controlled based on the first driving condition control settings but can pass the traffic light during the passing status at the estimated second arrival time when being controlled based on the second driving condition control settings, so as to pass the traffic light by control based on the second driving condition control settings.

Accordingly, the control unit may automatically cause adaptation of kinematic parameters such as velocity and/or acceleration of the vehicle in accordance with the second driving condition control settings in order to enable the vehicle to pass the traffic light at the estimated second arrival time during a traffic light passing status, such as a yellow and/or green light phase of the traffic light. Hence, adaptation of the kinematic vehicle state in accordance with second driving condition control settings may result in a more "sporty" driving behavior of the vehicle.

Accordingly, due to more abrupt changes or adaptations of the current driving conditions of the vehicle, a vehicle driver may perceive higher acceleration and/or speed values. However, a more drastic kinematic vehicle state enables passing of the traffic light during a yellow or green light phase. Therefore, it can be avoided to bring the vehicle unnecessarily to a stop in front of a traffic light in a non-passing status. Consequently, driving pleasure for a vehicle driver may be improved and traveling time between a predetermined origin and destination might be reduced.

According to an aspect, an apparatus for controlling an automated vehicle, may be provided comprising:
a controller being configured to control at least one of a driving direction of the automated vehicle, a speed of the automated vehicle and/or an acceleration of the automated vehicle based on first driving condition control settings;
wherein, when the automated vehicle is approaching a traffic light, the controller is configured to determine whether the automated vehicle can pass the traffic light, and to control the automated vehicle when being controlled based on the first driving condition control settings, if the determination result is that the automated vehicle can pass the traffic light when being controlled based on the first driving condition control settings, so as to pass the traffic light by control based on the first driving condition control settings;
wherein the controller is configured, if the determination result is that the automated vehicle cannot pass the traffic light when being controlled based on the first driving condition control settings, to determine whether the automated vehicle can pass the traffic light when being controlled based on second driving condition control settings and/or by manual override by a driver of the automated vehicle.

In some preferred embodiments, the first or second driving condition control settings may define one or more control parameters for controlling the vehicle. Moreover, the first and second driving condition control settings, i.e. both first and second driving condition control settings respectively, may define one or more control parameters for controlling the vehicle. In other words, first and/or second driving condition control settings may define one or more control parameters.

Preferably, control parameters may refer to a set of quantities defining a kinematic state of the vehicle, such as velocity, acceleration and/or position.

In preferred embodiments, the control parameters for controlling the vehicle may include at least one of a maximal positive longitudinal acceleration of the vehicle, a minimal negative longitudinal acceleration of the vehicle, a maximal lateral acceleration of the vehicle, and/or a maximal speed of the vehicle. In other words, extrema, i.e. maximum and/or minimum values, of the set of quantities defining a kinematic state of the vehicle may be utilized in order to characterize the first and/or second driving condition control settings, respectively. Preferably, maximal speed may correspond to a maximal allowed speed in accordance with traffic laws or more generally a maximal speed predetermined by safety regulations in connection with an area of operation of the vehicle.

Accordingly, first and second driving condition control settings can be precisely defined in relation to each other. Consequently, a vehicle driver can choose particular acceleration and/or velocity values, indicating individual preferences concerning perception of "normal" and "sporty" driving behavior. Consequently, thresholds for kinematic quantities such as acceleration and velocity classifying a kinematic vehicle state become individually adjustable. Hence, overall driving experience for a vehicle driver between an origin and destination can be improved. Moreover, traffic safety may consequently be improved due to individualized driving assistance of a vehicle driver.

In some preferred embodiments, the apparatus for controlling a vehicle may be characterized in that none of the control parameters will be exceeded when it is determined that the vehicle is being controlled based on the first driving condition control settings.

In other words, a set of maximal and/or minimal values of the kinematic variables such as acceleration or velocity may define first driving condition control settings. The second driving condition control settings may subsequently be defined such that at least one of the extrema of the kinematic variables is exceeded. For example, first driving condition control settings may be characterized by a maximal speed value as well as a maximal acceleration and a maximal deceleration value.

Accordingly, control of the vehicle based on the first driving condition control settings results in a kinematic state of the vehicle within the predefined limits of the kinematic variables. Consequently, none of the threshold values of kinematic variables will be overstepped or exceeded during control of the vehicle.

However, alternatively one set of values comprising kinematic variable limits or boundaries can be utilized in order to classify first driving condition control settings and second driving condition control settings may be classified in relation to a different second limited or bounded set of kinematic values. In other words, second driving condition control settings may be characterized by kinematic values such as acceleration and/or speed, ranging within the predefined boundaries of the second set of values only. This provides the advantage that estimation of a passing probability of a traffic light in accordance with second driving condition control settings can be performed independently of first driving condition control settings.

In summary, avoidance of exceeding any of the control parameters defining quantities such as acceleration and/or vehicle speed during vehicle control based on the first driving condition control settings, may allow for a uniformly vehicle driving behavior. Accordingly, drastic acceleration maneuvers and/or drastic changes of velocity can be avoided, which enhances traffic safety due to a reduced danger of vehicle collisions.

In some preferred embodiments, the apparatus for controlling a vehicle may be characterized in that at least one of the kinematic parameters will be exceeded when it is determined that the vehicle is being controlled based on the second driving condition control settings. In other words, exceeding or crossing of at least one of the threshold values of the kinematic variables may represent control of the vehicle based on second driving condition control settings. For example, when the first driving condition control settings correspond to a specified range of acceleration and/or velocity values of the vehicle, i.e. a set of possible acceleration and velocity values within a defined number interval, at least one of the interval limiting boundary values such as acceleration or velocity may be passed or overstepped, when the control unit determines to control the vehicle based on the second driving condition control settings. This provides additional driving assistance. In particular, a vehicle driver does not have to provide external input based upon, e.g. an educated guess, whether it is possible to pass the traffic light during a passing status. Consequently, sources of error due to human failure can be suppressed and traffic safety can further be improved.

In some preferred embodiments, the apparatus for controlling a vehicle may be characterized by a human machine interface. Preferably, the human machine interface may be configured to output a first signal to the driver of the vehicle if it is determined that the vehicle can pass the traffic light by manual operation of the driver of the vehicle based on adapted driving conditions based on the first driving condition control settings. Manual operation may refer to manual override by the driver, e.g. by activation of the vehicle gas pedal, or interacting with the human machine interface, e.g. by accepting an adaptation of driving condition control settings via activation of a respective button or segment displayed on the human machine interface.

Preferably, the human machine interface is a component of the apparatus for controlling a vehicle capable of handling human-machine interactions. The human machine interface may consist of hardware and software that allow user inputs to be translated as signals for machines that, in turn, provide the required result to the user. Preferably, the interactions may be of two types, i.e., human to machine and machine to human. The human machine interface may comprise motion sensors, keyboards and similar devices, speech recognition interfaces as well as any other interaction in which information is exchanged using optical signals, acoustic signals (e.g. sound), temperature gradients and other physical modes such as haptic feedback. In particular, touchscreens may be part of preferred examples of the human machine interface. The advantages provided by incorporating a human machine interface comprise error reduction, increased information processing as well as efficiency for a vehicle driver. Consequently, utilization of a human machine interface is supportive in a reduction of physical or mental stress for the vehicle driver during vehicle operation and consequently improves reliability and traffic safety.

In preferred embodiments, the first signal may be an optical signal on a display of the human machine interface arranged in sight of the driver of the vehicle. To be more specific, the optical signal might comprise color-coded optical signals or geometric symbols displayed visibly for the driver of the vehicle on the display. For example, the first signal might corresponds to particularly color-coded item on the display such as a red item. However, any other color generally visible to human perception, i.e. 390-700 nm, may be utilized for the color-coded item. Alternatively, the first signal may be an acoustic signal emitted by one or more speakers comprised by the human machine interface. More specifically, the acoustic signal might comprise one or more out of a series of audible tones. For example, a jingle or melody may be utilized as first (acoustic) signal.

In some preferred embodiments, the human machine interface may be configured to output a second signal to the driver of the vehicle if it is determined that the vehicle can pass the traffic light based on adapted driving conditions based on the second driving condition control settings. In accordance to the above, the second signal may be an optical signal on a display or an acoustic signal released or emitted by one or more speakers of the human machine interface. For example the second signal may be an optical signal corresponding to another color-coded item on the display such as a green item. However, any other color generally visible to human perception may be utilized for the color-coded item corresponding to the second signal. Alternatively, second signal may be an acoustic signal emitted by one or more of the speakers of the human machine interface. In particular, the acoustic signal might comprise a series of audible tones different from the ones used for the first (acoustic) signal.

Preferably, the first signal may be provided to the vehicle driver as long as it is possible to reach the traffic light in a passing status based on adaptation of the kinematic vehicle state in accordance with the first driving condition control settings. In particular, the first driving condition control settings may also comprise the current driving conditions. Consequently the first driving conditions may also be defined to comprise no adaptation of the current driving conditions.

Furthermore, when it is determined that the vehicle may reach the traffic light during a passing status based on adapted driving conditions in accordance with the second driving condition control settings, the second signal may be provided to the driver of the vehicle.

In other words, the apparatus controlling the vehicle determines for how long passing of the traffic light during a yellow or green light phase might be possible based upon an adaptation (wherein the amount of adaptation may also be zero, i.e. representing merely unchanged current driving conditions) of the current driving conditions corresponding to the first driving condition control settings. For the duration of that determined time period (i.e. the time period indicating a possible traffic light passing), a first signal in form of will be output on the human machine interface. For example, a red color item may be indicated on the human machine interface display or a series of audible tones may be released by the human machine interface speakers as long as it is possible to pass the traffic light based on an adaptation of current driving conditions according to the first driving condition control settings.

After elapsing of the time period indicating a possible passing of the traffic light during a yellow or green light phase, release of the first signal, i.e. the red color-coded item on the display or the acoustic signal in form of a series of audible tones, will be stopped by the apparatus for controlling the vehicle. However, if it was determined that the vehicle may still arrive at the traffic light during a passing status, when an adaptation of the current kinematic vehicle state will be performed according to second driving condition control settings, a second signal in form of, e.g. a green color-coded item on the human machine interface display or a serious of audible tones, are provided via the human machine interface. Hence, information is provided indicating a passing possibility of the traffic light during a green or yellow traffic light phase assuming a more "sporty" driving behavior. In addition, the first and the second signal may also be a combination of optical and acoustic signal. For example, the first signal may be a red color-coded item displayed on the human machine interface display and the second signal may be an acoustic signal in form of a series of audible tones. Moreover, the second signal may only be provided when output of the first signal is stopped, i.e. when a passing of the traffic light according to first driving condition control settings is not possible anymore. Alternatively, first and second signal may be provided simultaneously. In preferred embodiments, the interplay between first and second signal may be chosen according to individual preferences of a vehicle driver. In particular, a menu provided on the display of the human machine interface might provide settings concerning output of the first and second signal. In other words, according to the provided menu various possibilities of releasing the first and second signal might be composed or selected from the menu according to individual driver preferences.

Therefore, the vehicle driver is provided with supplementary information concerning the possibility of reaching the traffic light during a passing status, even when it has been determined that passing of the traffic light during a passing status according to first driving condition control settings may not be possible. In particular, the second signal provided to the vehicle driver via the human machine interface supplies information that passing of the traffic light during a passing status might still be possible, when an adaptation of the current driving conditions according to second driving condition control settings is performed.

Accordingly, the provided driving assistance contributes in error reduction. In particular, a driver estimate of whether it is possible to reach the traffic light during a passing status might be erroneous. Moreover, driving control decisions based upon such an erroneous estimate might lead to unsafe driving behavior. Consequently, information provided via the human machine interface indicating possible passing scenarios of the traffic light according to first and second driving condition control settings improves traffic safety.

In some preferred embodiments, the processing unit of the apparatus for controlling a vehicle may determine a time period during which adapted driving conditions based on the second driving condition control settings by manual overrides by a driver of the vehicle enables the vehicle to pass the traffic light during a passing status.

Consequently, the processing unit may determine a "window of opportunity" during which an adaptation of the current driving conditions in accordance with the second driving condition control settings may result in arrival of the vehicle at the traffic light during a passing status. In other words, the processing unit may determine a time interval during which a "sporty driving" i.e. exceeding of at least one of the kinematic variable thresholds defining the first driving conditions will enable an arrival of the vehicle during a passing status of the traffic light. For example, an increase of acceleration beyond a threshold determined by the first driving condition control settings may enable the vehicle to arrive at the traffic light during a yellow and/or green light phase of the traffic light.

Preferably the human machine interface may further be configured to output the second signal for the duration of the time period and to output a third signal to the driver of the vehicle after elapsing of the time period indicating that passing of the traffic light by manual override by the driver based on the second driving condition control settings does not further enable the vehicle to pass the traffic light.

Therefore, in accordance with a determination of the processing unit that adaptation of the current driving conditions based upon the second driving condition control settings allows for a passing of the traffic light during a passing status, the human machine interface may output a second optical or acoustic signal as long as it is possible to reach the traffic light during a passing status based upon second driving condition control settings, i.e. a more "sporty driving". When passing of the traffic light during a passing status based upon an adaptation of the current driving conditions in accordance with the second driving condition control settings is not possible any longer, the processing unit may be configured to output a third optical or acoustical signal to the driver via the human machine interface. In accordance with the embodiments described above, the third signal might, e.g. be a blue color-coded item on the human machine interface. Alternatively, the third signal might be another series of audible tones. However, the third signal might also correspond to interruption or stopping of the provision of the first and/or second signal. In other words, disappearance of the first and/or second signal on output devices of the human machine interface such as human machine interface display or speakers, may indicate that passing of the traffic light during a passing status is not possible any longer.

Hence, the vehicle driver is provided with detailed information indicating the time interval for which an adaptation of the current driving conditions of the vehicle enables and arrival at the traffic light during a passing status. Therefore, a vehicle driver is provided with information which can be utilized to prevent risky and/or unnecessary driving maneuvers. Based upon the provided information, in particular comprised within the third signal, a vehicle driver can refrain from futile driving maneuvers such as too drastic acceleration and speed increases, which would not enable an arrival at the traffic light during a passing status but in addition, endanger other traffic participants. Hence, traffic safety is improved.

In some preferred embodiments, the apparatus for controlling a vehicle may be characterized in that the determination, whether the vehicle can pass the traffic light during a passing status by manual override by the driver of the vehicle based on the second driving condition control settings, is based on a speed limit.

Preferably, and as already indicated above a speed limit may refer to a velocity restriction in accordance with traffic laws or more generally a speed limitation based upon rules of the area of operations of the vehicle. For example, in the context of mining operations, wherein the controlled vehicle may refer to a dump truck or other construction vehicles, the speed limit may be a reference to a recommended speed or target speed. Information concerning the local speed limitation may, e.g. be externally provided to the apparatus for controlling the vehicle. In particular, local speed limitation may be stored in connection with map data of the area of vehicle operation on the memory of the apparatus for controlling a vehicle. In accordance with position determination means of the vehicle, such as a global positioning system, the apparatus for controlling the vehicle may deduce speed limitations within the vicinity of the vehicle. However, other means for obtaining local speed limitations may be implemented. For example, the traffic light detection unit may be further configured to recognize local speed limitations by scanning traffic signs along the trajectory of the vehicle. Therefore, even if passing of the traffic light during a passing status would be possible in accordance with an adaptation of the current driving conditions of the vehicle, a corresponding first or second signal is not provided via the human machine interface. Alternatively, the third signal may be provided via the human machine interface if it is determined that only an adaptation of current driving conditions leading to a violation of the local speed limit would enable passing of the traffic light during a passing status.

Consequently, taking into account speed limitations further increases safety of the vehicle operation in interplay with other traffic members.

In some preferred embodiments, the apparatus for controlling the vehicle may comprise a communication unit. Preferably, the communication unit may be configured to communicably connect with a communication unit of the traffic light to obtain traffic light status information.

The communication unit may be an element of equipment or hardware designed to move information or data from one place to another. For example, the communication unit may be part of a communication system, i.e. a collection of individual communications networks, transmission systems, relay stations capable of interconnecting and interoperating to form an integrated whole. Preferably, the communication unit might be part of a communication system utilizing radio or mobile internet connections. In particular, direct radio communication between the traffic light and the apparatus for controlling the vehicle may be enabled upon request of the vehicle approaching the traffic light.

Alternatively, a communication path utilizing the World Wide Web (i.e. mobile internet) may be utilized. In particular, the traffic light communication unit might be connected to the World Wide Web and outputs data concerning current and future traffic light statuses to a central server. The communication unit of the apparatus for controlling the vehicle may be configured to be connectable to the World Wide Web (e.g. via utilization of a mobile or other wireless network) and to request from the central server information regarding traffic light phases of a traffic light being approached. In particular, information relating to duration of current and future traffic light phases may be exchanged between the traffic light and the apparatus for controlling a vehicle.

Preferably, the apparatus for controlling the vehicle comprising the communication unit is further configured, wherein the traffic light status of the traffic light at the estimated first or second arrival time and the duration until a time of switching of a traffic light status of the traffic light is determined based on the obtained traffic light status information. Alternatively, merely the duration until a time of switching of a traffic light status of the traffic light at the estimated first or second arrival time may be determined, respectively, based on the obtained traffic light status information.

Accordingly, a configuration, wherein traffic light status information between the traffic light and the apparatus of the vehicle is exchanged in order to coordinate driving behavior, can improve traffic safety, at intersections as well as traffic flow. Hence, energy efficiency during vehicle operation can be enhanced, which in turn can lower emissions of vehicle exhaustion fumes. Consequently, negative environmental impact of operating a vehicle can be reduced.

Therefore, the above stated interconnection of vehicles and traffic lights, i.e. enabling a communication between vehicles and traffic lights regarding traffic light statuses, is a potent way to avoid congestion and accidents in urban traffic and to improve driving efficiency of the vehicle.

In some preferred embodiments, the apparatus for controlling a vehicle may be characterized in that the determination, whether the vehicle can pass the traffic light during a passing status when being controlled based on respective driving condition control settings, may further be performed in accordance with a determination of positions and velocities of other vehicles arranged ahead of the vehicle. Alternatively, the determination whether the vehicle can pass the traffic light during a passing status may be based upon a determination of positions or velocities of other vehicles, respectively. In yet a further alternative, the determination whether the vehicle can pass the traffic light during a passing status may be based upon a determination of velocities and estimated future positions of other vehicles located in the vicinity of the vehicle.

Preferably, for the purpose of detecting other traffic participants and predicting or estimating their trajectory the apparatus for control ling a vehicle may be configured to comprise a traffic participant detection system, which may use at least one out of radar, laser and optical input (camera) to detect other traffic participants. While laser and optical sensor types may display decreased performance during bad weather a radar system provides the advantage of good performance even during bad weather periods. Information related to positions, acceleration and/or velocities of other objects in relation to the vehicle to be controlled may be obtained by a sensor phalanx comprising at least one out of radar, laser and optical input detection means.

Once another traffic participant has been detected, the detection system either provides a warning to the driver when there is an imminent collision or provides corresponding signals to the control unit of the apparatus for controlling the vehicle, causing the control unit to autonomously take action without driver input, e.g. by breaking or steering of the vehicle or both.

In addition, based upon information indicating other traffic participants and their estimated trajectories it is estimated whether an adaptation of the current driving conditions will enable an arrival at the traffic light during a passing status. In other words, it is estimated whether an acceleration/deceleration or a change of velocity will interfere with estimated future positions of other traffic participants (vehicles) causing collision accidents.

Accordingly, the apparatus for controlling the vehicle may determine that an adaptation of the current kinematic vehicle state is not to be performed in case adaptation of the current kinematic state of the vehicle is not possible or advisable, since other vehicles or traffic participants, such as other cars, trucks, buses, motorcycles, bicycles or even pedestrians or deer crossing the road ahead constitute an obstacle for a safe adaptation of the kinematic vehicle state. For example, in accordance with other detected objects on the road a maneuver involving an acceleration in forward direction, i.e. forward driving direction, of the vehicle, might be rejected by the control unit/processing unit due to a possible collision between the controlled vehicle and the other object. Similarly, a driving maneuver or adaptation of kinematic vehicle state involving a deceleration of the vehicle might be rejected due to a potential rear end collision between the rear end of the vehicle and the other object, e.g. another car driving behind the vehicle to be controlled.

Hence, advantageously trajectories of other traffic participants, e.g. other vehicles or even pedestrians, may be taken into account when the apparatus for controlling a vehicle determines, whether it is possible to arrive at the approach traffic light during a passing status.

Accordingly, accidents, i.e. collisions between the vehicle to be controlled and other traffic participants, may be avoided and consequently, traffic safety during vehicle operation is further increased.

In some embodiments, the apparatus for controlling a vehicle may be characterized in that determination of traffic light position, the vehicle position and/or other vehicle positions is based upon data provided by at least one out of a camera, a laser distance measuring device, a global positioning system or infrastructure configured for vehicle-to-X communication (Car-to-X communication) (e.g. traffic light, monitoring camera, or a communication network with other vehicles). In particular, Car-to-X communication may refer to radio-based or internet-based exchange of information between vehicles, as well as between vehicles and traffic infrastructure. In other words, a determination of at least one out of a traffic light position, the vehicle position, or other vehicle positions is based upon data provided by at least one out of a camera, a laser distance measuring device, a global positioning system or a communication network with the other traffic participants and/or traffic infrastructure.

Preferably, as already indicated above, the vehicle may comprise a plurality of sensors. For example, the sensors may be arranged within a sensor phalanx, preferably comprised by the coachwork of the vehicle. The sensors may be configured to scan, either continuously or upon request, the environment of the vehicle for other objects. Preferably, the sensors scan for other traffic participants, such as other motorized vehicles, pedestrians, bicycles, traffic lights or a combination thereof. The information concerning other vehicles in the proximity of the vehicle may be evaluated by the processing unit and further processed during a determination of whether it is possible to reach the traffic light during a passing status.

Preferably, the sensor devices or sensor means comprise a camera, or a laser distance measuring device to enable active position and/or velocity determination of other objects in the proximity of the vehicle. In addition, radar systems may also be utilized. For example, a current position and future trajectory of another vehicle may be determined based upon analysis of video information provided by a camera. Similarly, a laser or radar distance measuring device may constantly measure the distance between the vehicle to be controlled and another object, e.g. a car, in the proximity of the vehicle by emitting a light, laser or radar signal and measuring the run-time of the signal from emitting until detection of the reflected light or laser been. Based upon the continuous analysis of the run-time a determination of the trajectory of the other object may be enabled.

Alternatively, the information concerning current positions and future trajectories of other traffic participants in relation to the vehicle may be obtained utilizing a global positioning system. In particular, the information relating to the trajectory of the vehicle and the trajectories of other traffic participants in the proximity of the vehicle may be, upon request or automatically, provided to the processing unit, wherein a determination whether the vehicle can reach the traffic light during a passing status is performed in accordance with the provided GPS data.

In other preferred embodiments, a vehicle-traffic light communication network may provide information relating to position of the traffic light and estimated trajectories of other mobile traffic participants in communication with that traffic light. In particular, the traffic participants may, continuously or upon request, sent information concerning their position and/or velocity to the traffic light (or a traffic light information processing unit associated with the traffic light and providing dater related to the traffic light position). In turn, the traffic light (or the traffic light information processing unit) may upon request sent the accumulated information to the vehicle to be controlled. Based upon this information, i.e. order and duration of traffic light phases and trajectory information of other traffic participants, the processing unit may determine whether the vehicle may be enabled to arrive at the traffic light during a passing status.

Accordingly, the potential for dangerous traffic situations can be reduced. In particular, when approaching a traffic light, prevention of collisions or accidents between vehicles in highly complex traffic situations, i.e. situations involving a high number of other traffic participants, can be achieved.

Specifically, the potential for errors due to human misinterpretation resulting from exceptional stress and pressure situations involving a high traffic participant number during vehicle operation can be prevented. Consequently, traffic safety is improved considerably.

According to another aspect, there may be provided a method for controlling a vehicle.

The method for controlling a vehicle may comprise determining, whether the vehicle is approaching a traffic light. For example, sensors of a sensor phalanx comprised in the vehicle may be utilized in order to detect when a vehicle is approaching a traffic light. In particular, a traffic light approach may be detected by an interplay between a processing unit of the vehicle and the vehicle sensors (e.g. cameras) scanning the external proximity of the vehicle. For example, a camera may provide optical information indicating that the vehicle is approaching a traffic light, this information may be provided to the processing unit. In response to analyzing the provided data the processing unit may determine that the vehicle is approaching a traffic light. Alternatively, determination whether the vehicle is approaching a traffic light may also be performed in correspondence to data provided by distance measuring systems or global positioning systems. Furthermore, determination whether the vehicle is approaching a traffic light may also be performed based upon data provided by a traffic light or a traffic light information processing unit associated with the traffic light. For example, a traffic light may continuously or upon request provide information/data indicating its geographic position and/or duration of current and future traffic light phases.

Accordingly, a high level of identification reliability of an approached traffic light can be achieved.

Preferably, the method for controlling a vehicle may comprise estimating, when the vehicle is detected approaching a traffic light, a first arrival time of the vehicle at the traffic light based on current driving conditions and a second arrival time of the vehicle at the traffic light based on adapted driving conditions different from the current driving conditions. In view of the above, such an estimate may be based upon data provided by sensors of the vehicle or alternatively, information issued or provided by the traffic light. In particular, an evaluation of the current kinematic state of the vehicle may enable a calculation or estimation of arrival times of the vehicle at the traffic light based upon the current kinematic vehicle state and an adaption thereof. An adaptation of the current kinematic state may be performed by changing kinematic variables such as velocity, acceleration or position of the vehicle.

In preferred embodiments, the method for controlling a vehicle may further comprise determining a traffic light status of the traffic light at the first and second arrival times. Preferably, the traffic light status being a passing status allowing the vehicle to pass the traffic light or a stopping status requiring the vehicle to stop at the traffic light.

Thus, based upon an estimated first arrival time it can be determined in accordance with information relating to the duration of current and future traffic light statuses, whether the vehicle will arrive at a passing status of the traffic light at a second arrival time of the vehicle based upon adapted driving conditions. An adaptation of driving conditions may refer to a change of kinematic variables such as vehicle velocity and/or acceleration. Information concerning current and future traffic light phases may either be obtained by a direct communication link between the vehicle approaching the traffic light and the traffic light or by determining durations of current and future traffic light statuses utilizing information obtained by detecting duration, i.e. length, of a current and subsequent traffic light phases. For example, a camera may be configured to record the individual traffic light phases and provide the information to a processing unit of the vehicle. The processing unit may be electronic circuitry within a computer of the vehicle that carries out instructions of a computer program directed to vehicle control.

In particular, the processing unit may analyze the video data and determine duration of the respective traffic light phases in accordance with frequency and duration of color change of the individual traffic light phases.

Accordingly, a reliable and particularly error-prone method for determining traffic light statuses and vehicle arrival times at the traffic light is provided.

Preferably, the method for controlling a vehicle may further comprise calculating or determining, whether the vehicle can pass the traffic light based on the current driving conditions of the vehicle based on a determination whether the traffic light has a passing status at the estimated first arrival time and calculating whether the vehicle can pass the traffic light based on the adapted driving conditions of the vehicle based on a determination whether the traffic light has a passing status at the estimated second arrival time.

Hence, based upon obtained information relating to duration of current and future individual traffic light phases, the processing unit may perform the step of calculating determining whether the vehicle can arrive at the estimated first arrival time during a passing status. In parallel the processing unit may further determine, whether the vehicle can arrive at the traffic light during a passing status at the second estimated arrival time.

Accordingly, a method is provided which may improve traffic flow and traffic safety. In particular, it is possible to evaluate whether change of a kinematic vehicle state in accordance with predicted traffic light statuses enables the vehicle to arrive at estimated times at the traffic light. Consequently, long periods of waiting in front of traffic lights in a stopping status, e.g. red light phase, may be prevented. Furthermore, the number of driving maneuvers comprising a deceleration towards full vehicle stop followed by a run-up of the vehicle are decreased or even entirely prevented. In particular, driving maneuvers such as approaching a traffic light, decelerating the vehicle until the vehicle stops, waiting in front of the traffic light in a stopping status and accelerating the vehicle towards cruising speed after the traffic light switches to a passing status have poor fuel consumption efficiency. Consequently, the method for controlling a vehicle reduces fuel consumption. Hence, cost for operating a vehicle and an environmental impact of vehicle operation can be decreased. For example carbon dioxide or other exhaust fumes emissions may be reduced or prevented.

According to another aspect, there may be provided a computer program product including computer-readable program instructions stored on a computer-readable medium which, when loaded to a control unit of an apparatus for controlling a vehicle, are configured to cause the control unit to execute the steps of a method of any of the above aspects and embodiments, or combinations thereof.

The computer readable program instructions may be provided to the processor of a general purpose computer, special purpose computer (such as the control unit/processing unit), or other programmable data processing apparatus to produce a particular machine, such that the program instructions, which execute via the processor of the computer or other programmable data processing apparatus, generate means for implementing the functions for controlling a vehicle.

BRIEF DESCRIPTION OF THE DRAWINGS in the following the invention will further be explained based on at least one preferential example of the invention with reference to the attached exemplary drawings, wherein:

FIG. 1 exemplarily depicts a schematic illustration of a section of an exemplary embodiment of the apparatus for controlling a vehicle;

Figure 5:
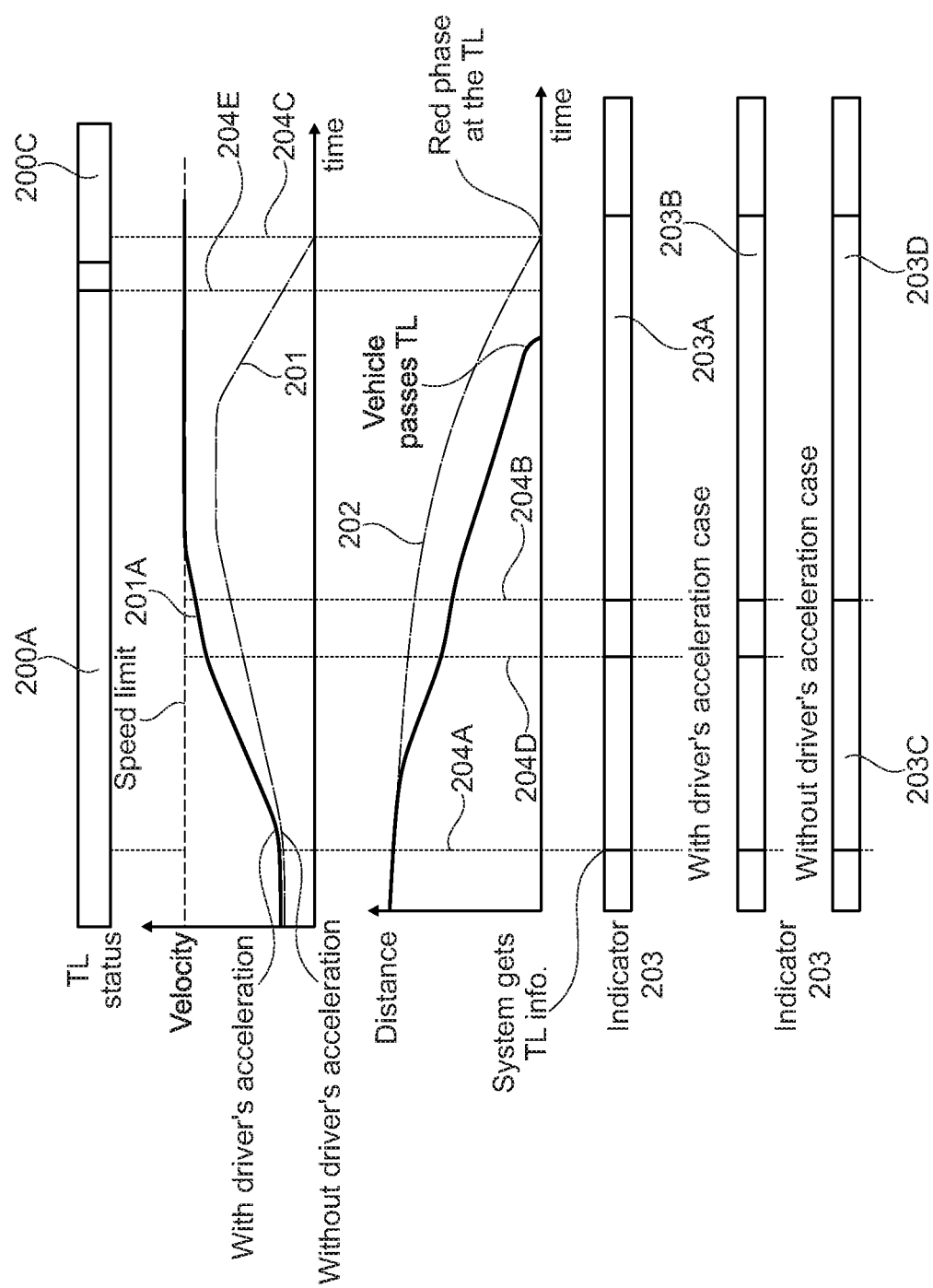

FIG. 5 displays a situation, wherein the traffic light is initially in a passing status.

Figure 6:
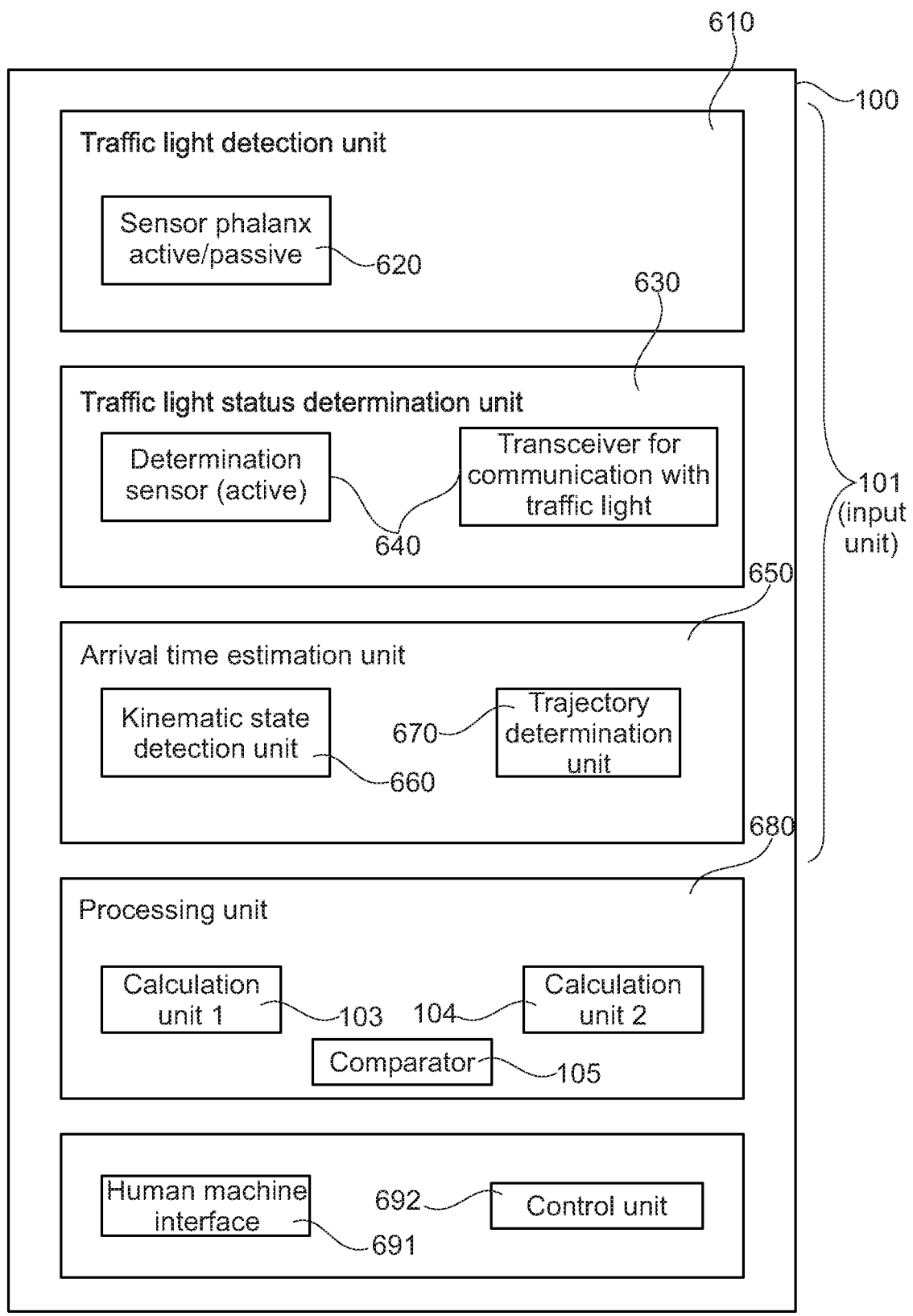

FIG. 6 exemplarily depicts a schematic illustration of the apparatus for controlling a vehicle.

Figure 7:
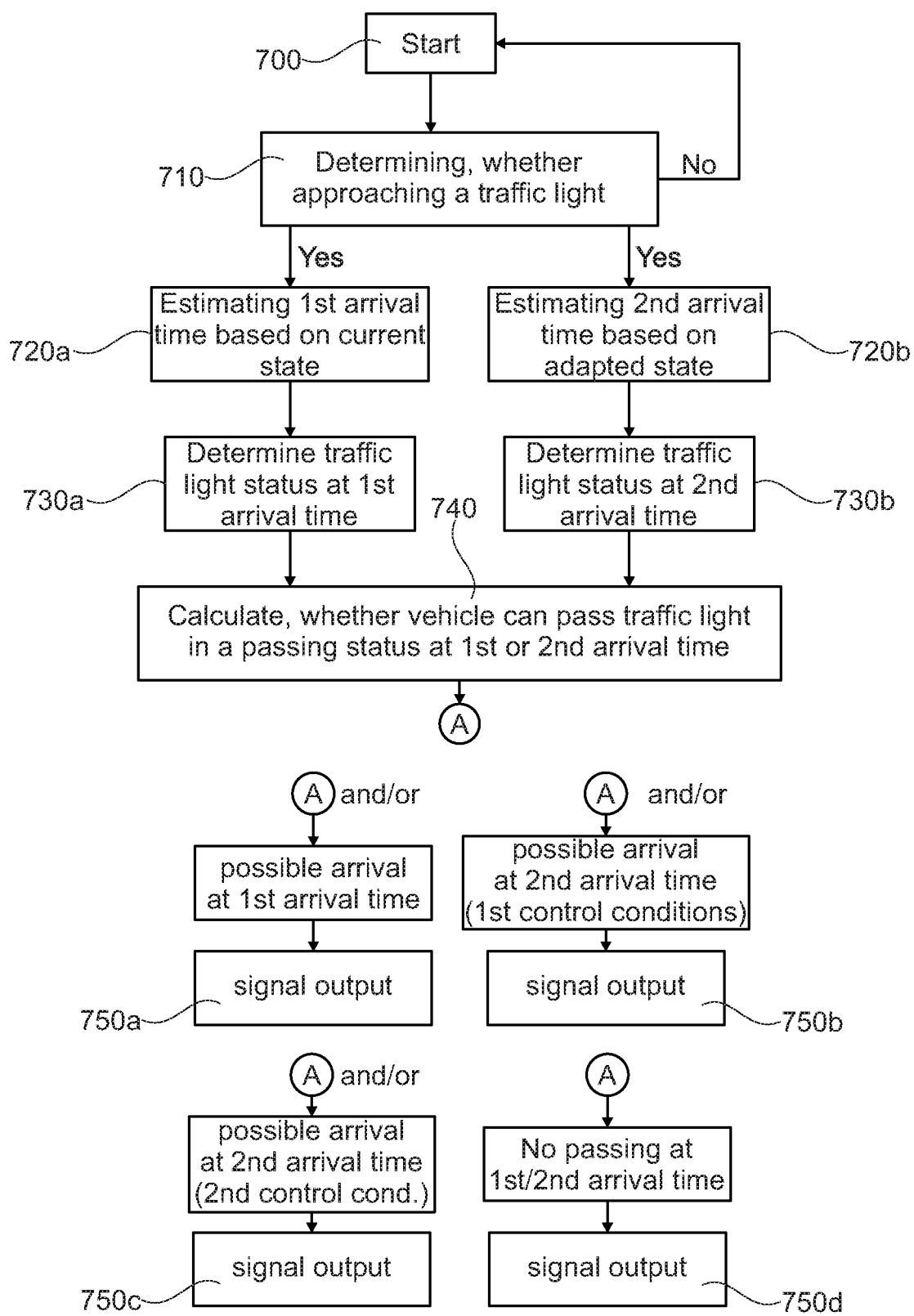

FIG. 7 exemplarily depicts a schematic illustration of a method for controlling a vehicle.

DETAILED DESCRIPTION OF DRAWINGS AND OF PREFERRED EMBODIMENTS

In the following, preferred aspects and exemplary embodiments will be described in more detail with reference to the accompanying figures. Same or similar features in different drawings and embodiments are sometimes referred to by similar reference numerals. It is to be understood that the detailed description below relating to various preferred aspects and preferred embodiments are not to be meant as limiting the scope of the present invention.

Figure 1:
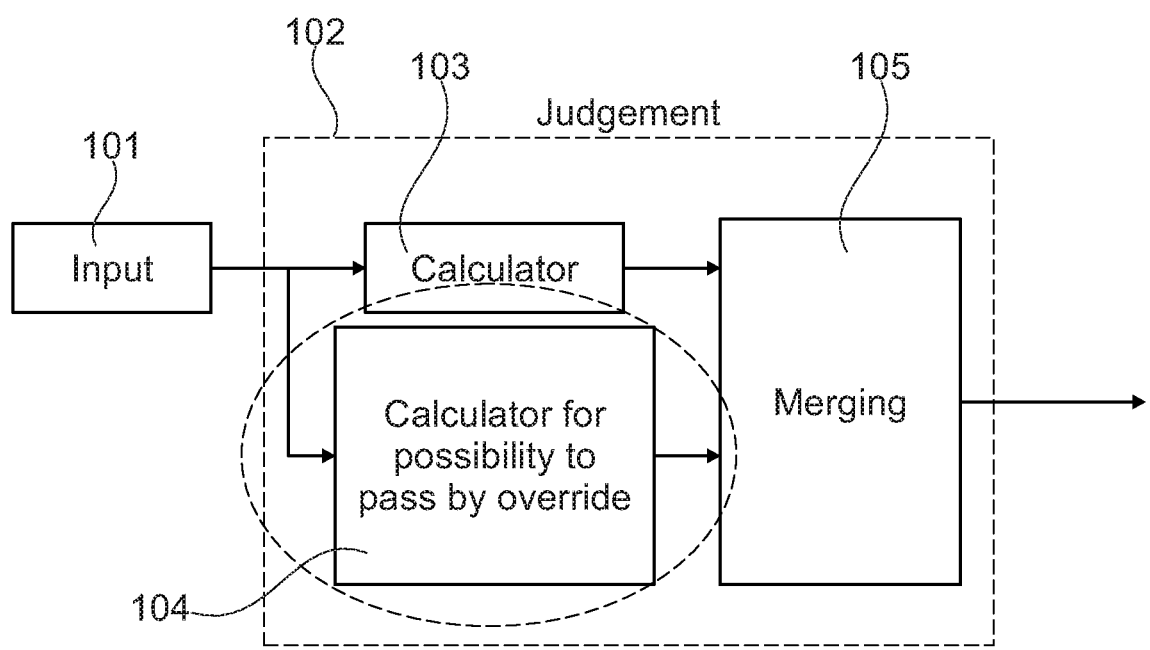

FIG. 1 depicts a schematic illustration of a section of an exemplary embodiment of the apparatus 100 for controlling an automated vehicle. In particular, an input unit 101 is displayed, which is capable of accumulation of data relating to geographic and kinematic parameters of the vehicle controlled by the apparatus 100. Furthermore, the input unit 101 is also capable of gathering or receiving geographical data concerning the position of traffic lights. For this purpose, the input unit 101 is provided with a variety of sensors configured to determine a distance between the vehicle and a traffic light as well as traffic light phase information.

In other words, the input unit 101 can determine a distance between the vehicle and a traffic light as well as information relating to a current and future traffic light status. Specifically, traffic light status information comprises information relating to the current individual light phase of the traffic light as well as information concerning the duration of a time period until the traffic light changes to a next traffic light status. Consequently, the input unit 101 can be utilized to determine time durations between individual traffic light statuses as well as starting times of individual traffic light statuses, such as green, amber (yellow) or red.

Consequently, the input unit 101 provides information relating to a current status of a traffic light and the specific duration for which the traffic light will remain in a current status as well as a time period determining the beginning of a predetermined status of the traffic light.

For this purpose, the input unit 101 can receive traffic light status information transmitted by a particular traffic light as well as location data relating to the geographic position of the traffic light in relation to the geographic position of the vehicle. Information relating to traffic light status information as well as the location of the traffic light can be communicated between the traffic light and the vehicle via a wireless connection link.

In particular, such an information exchange between the apparatus 100 for controlling the vehicle and the traffic light can be realized by communication means that allow a wireless submission of data at sufficient transmission speeds. The communication link between the apparatus 100 for controlling the vehicle and a specific traffic light can, e.g., be realized utilizing commercially available mobile telecommunication networks. Furthermore, various different sensor technologies—such as radar, camera, radar and V2X communication—can provide a detailed image of what is going on around the vehicle. Consequently, these sensor technologies can also be employed for transferring information between a traffic light and the apparatus 100 for controlling the vehicle. In particular, the distance between the controlled vehicle and a specific traffic light can be determined utilizing either data obtained by a satellite navigational system (e.g. GPS) or data obtained by at least one of a camera, a laser distance measuring system or a vehicle-traffic light communication network.

The information input relating to positional and kinematic information of the vehicle as well as status information relating to a traffic tight that the automated vehicle is approaching can be utilized as input to determine whether the automatic vehicle can pass the traffic light utilizing predetermined driving condition control settings. In other words, based on information provided to the input unit 101 the apparatus 100 for controlling the automated vehicle estimates a possibility to pass a traffic light. Accordingly, vehicle control can be performed accordingly.

For this purpose, first and second driving condition control settings are defined. In particular, first driving condition control settings can comprise limitations relating to maximal positive longitudinal acceleration, minimal negative longitudinal acceleration, a maximal lateral if acceleration and/or a maximal speed of the automated vehicle. In other words, the first driving condition control settings are characterized by compliance of vehicle driving conditions with predetermined kinematic thresholds. In addition, second driving condition control settings can be distinguished or defined by exceeding at least one of the above-mentioned kinematic parameter thresholds. In other words, the first driving condition control settings classify a "comfortable" or "balanced" driving style, whereas the second driving condition control settings reflect a more "sporty" driving style.

The information obtained by input unit 101 is provided to a first calculation unit 103 as well as a second calculation unit 104. The first calculation unit 103 utilizes the provided data to determine whether it is possible for the vehicle to pass the traffic light in accordance with the first driving condition control settings. Specifically, the first calculation unit 103 determines whether the vehicle can pass the traffic light during a yellow or green traffic light status, i.e. before switching to red, when adapting current driving conditions in accordance with the predefined first driving condition control settings. To put it differently, the calculation unit 103 probes the possibility of whether it is possible to pass the traffic light in a yellow or green traffic light status while maintaining a "comfortable" driving style, i.e. without any change of acceleration or velocity that might be perceived as excessive by a vehicle driver.

In parallel, the second calculation unit 104 processes the information provided by the input unit 101 to determine whether the traffic light can be passed in a non-red traffic light status under the assumption that at least one of the predetermined kinematic parameters controlled by the first driving condition control settings has to be exceeded. For example, it is estimated whether exceeding predetermined acceleration or speed thresholds, might enable the vehicle to cross or pass the traffic light during a green or yellow (amber) traffic light phase.

In other words, the second calculation unit 104 asserts the possibility of passing the traffic light in accordance with a more "sporty" driving behavior.

Subsequently, the output from the calculation unit 103 and the calculation unit 104 is provided to a comparator unit 105. The comparator unit 105 compares the output data from the first calculation unit 103 and the second calculation unit 104 and determines, whether the vehicle can pass the traffic light in a green or yellow traffic light phase in accordance with either the first or second driving condition control settings.

If it is determined by the comparator unit 105 that the vehicle can pass the traffic light assuming the first driving condition control settings, i.e. without exceeding any of the predetermined kinematic vehicle parameters, the vehicle can be controlled to approach the traffic light in accordance with the first driving condition control settings. Consequently, the predetermined kinematic parameters of the vehicle will not be exceeded while approaching the traffic light, which results in a comfortable driving perception for a vehicle driver.

However, if it has been determined by the calculation unit 103 that the vehicle will not be able to pass the traffic light assuming the first driving condition control settings, the comparator unit 105 probes the possibility, wherein exceeding one or more of the predetermined kinematic parameters can enable the vehicle to reach the traffic light in a yellow or green traffic light status. Consequently, if the output of the calculation unit 104 confirms a possibility to pass the traffic light under the assumption of the second driving condition control settings, i.e. allowing at least one of predetermined kinematic parameter thresholds to be exceeded, the comparator unit 105 provides an output, upon which the vehicle can be controlled accordingly. In particular, the kinematic parameter that would enable the vehicle to pass the traffic light can be controlled to be adapted in order to enable arrival of the vehicle at the traffic light during a passing status.

For example, if it is determined that a longitudinal or lateral acceleration of the vehicle has to be exceeded by a determined value for a determined duration in order to pass the traffic light, the kinematic state of the vehicle can be accordingly. Consequently, the vehicle can pass the traffic light in a yellow or green traffic light status.

For example, a prolonged positive longitudinal acceleration in driving direction (forward acceleration) might enable the vehicle to pass the traffic light. Alternatively, a prolonged negative longitudinal acceleration in driving direction (breaking) might also enable the vehicle to pass the traffic light.

In particular, if it was determined by the second calculation unit 104 that despite an excessive acceleration in forward direction of the vehicle passing of the traffic light during a passing status would not be enabled, the second calculation unit 104 might have determined, based on the input information, that exceeding the parameters relating to negative longitudinal acceleration might be sufficient to arrive at the traffic light in a yellow or green traffic light status.

In other words, by excessively decreasing the vehicle speed, i.e. abrupt breaking, the traveling/cruising time of the vehicle to cover the distance towards the traffic light can be prolonged. Subsequently, the red traffic light status can switch to a green traffic light status in the meanwhile allowing the approaching vehicle to arrive during a green traffic light phase.

Hence, even if the traffic light cannot be passed in a green or yellow traffic light status assuming the first driving condition control settings it might still be possible to pass the traffic light assuming the second driving condition control settings allowing the vehicle to approach the traffic light in a more "sporty" way.

Therefore, even though a vehicle driver might have to accept some level of discomfort during vehicle control based upon the second driving condition control settings a passing of the traffic light during a passing status can be enabled.

Figure 2:
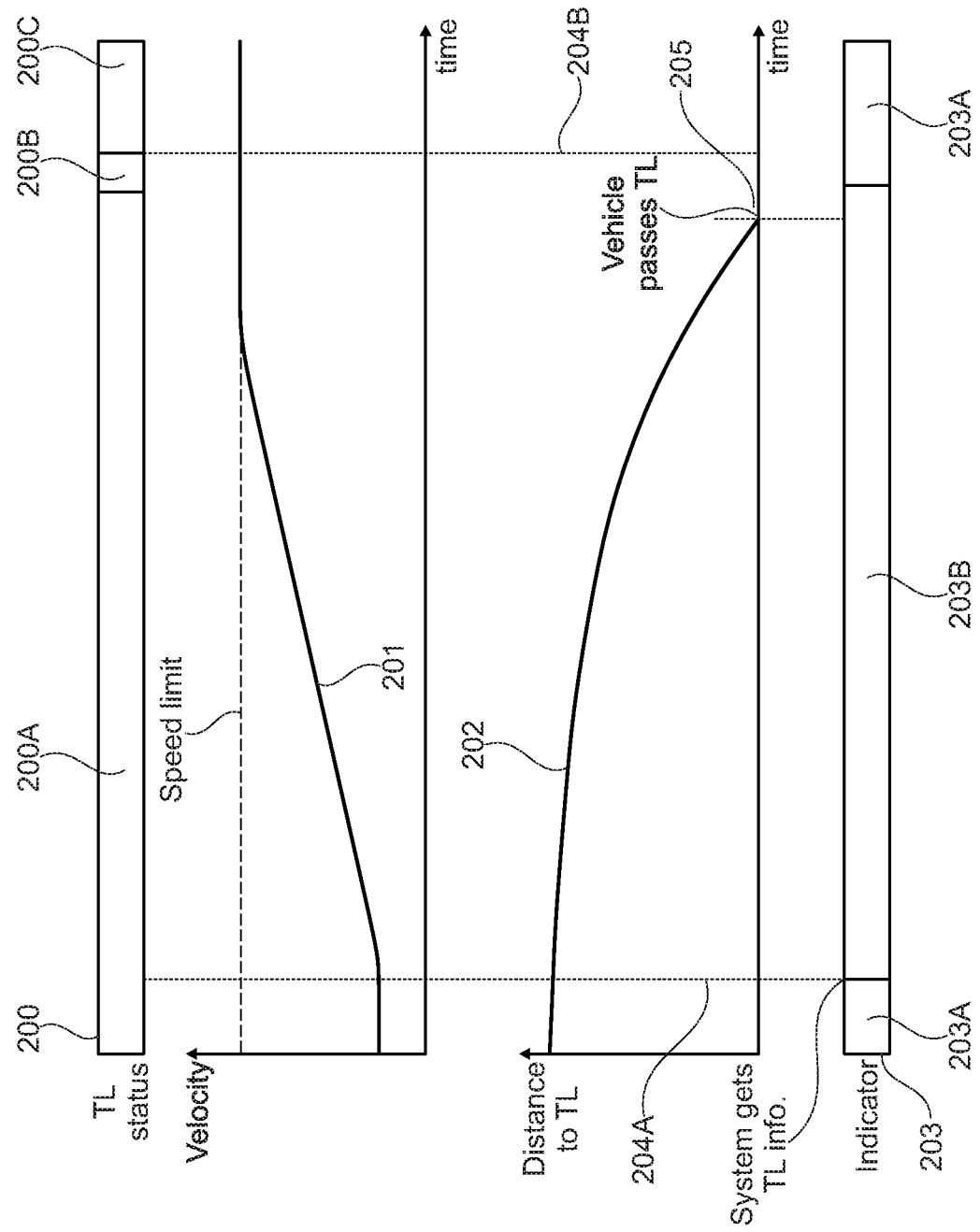
FIG. 2 depicts a situation a, wherein the vehicle is enabled to pass the traffic light in a green traffic light status before the traffic light signals status switches to a red traffic light status.

FIG. 2 depicts vehicle control in a normal passing situation. In particular, a traffic light status 200 indicates a first traffic light status 200 A (green), a second traffic light status 200 B (yellow) and a third traffic light status 200 C (red). The green traffic light status 200 A lasts for a first duration, the yellow traffic light status 200 B lasts for a second duration and the third traffic light status lasts for a third duration. The respective traffic light status durations are indicated by the segment sizes of different traffic light statuses 200 A, 200 B, 200 C.

In addition, a velocity-time diagram is shown (the ordinate of the diagram corresponding to velocity and the abscissa of the diagram corresponding to elapsed time), which represents a velocity graph 201 of the vehicle to be controlled.

Moreover, a local speed limit is indicated by the horizontal dashed line. According to the velocity graph 201, the speed of the vehicle initially remains constant and is subsequently increased until it is in accordance with the local speed limit.

Furthermore, in comparison with the velocity-time diagram another diagram is depicted, wherein the ordinate indicates the distance of the vehicle to the traffic light and the abscissa indicates elapsed time. A curve or graph 202 depicts the functional relationship between the distance of the vehicle to the traffic light independence of time.

An indicator 203 is configured to provide optical information related to the possibility of passing the traffic light status in accordance with first driving condition control settings.

The vertical dashed lines 204 A, 204 B represent a "window of opportunity" for passing the traffic light in a non-red traffic light status 20. To be more precise, during the time interval defined by the dashed lines 204 A, 204 B passing of the traffic light in a green or yellow traffic light status is enabled.

The following provides a demonstrative example of a process in relation to FIG. 2, wherein a vehicle is approaching a traffic light and wherein the possibility of passing the traffic light during a passing status is estimated.

The process begins with an initial cruising velocity of the vehicle and initial distance between the vehicle and the approached traffic light. The initial distance between the vehicle and traffic light is given by the intersection, i.e. zero time, of ordinate and graph 202 in the diagram that depicts the functional relationship between distance to traffic light and time. Analogously, the initial velocity is provided by the intersection of the ordinate and velocity graph 201 in the diagram representing the functional relationship between vehicle velocity and elapsed time. At zero time the specific status of the traffic light is green 200 A. As time lapses, the distance between the vehicle and the traffic light decreases in accordance with the vehicle approaching the traffic light.

At a time indicated by the dashed line 204 A the apparatus 100 for controlling the automated vehicle receives information related to the current status 200 (green) of the traffic light.

In addition, geographic position data of the vehicle and the traffic light as well as data r indicating the current kinematic state of the vehicle is obtained. Accordingly, the apparatus 100 for controlling the vehicle determines the distance between the vehicle and the traffic light based upon the obtained position data as well as kinematic variables such as current velocity and acceleration of the vehicle.

The apparatus 100 subsequently determines that in accordance with predetermined kinematic thresholds, i.e. first driving condition control settings, the velocity of the vehicle has to be increased in order to enable passing off the traffic light during a non-red traffic light status. Accordingly, the apparatus increases the velocity of the vehicle up to a local speed limit and maintains the updated or adapted velocity of the vehicle. This process is summarized in the characteristics of the exemplary velocity graph 201 depicted in FIG. 2.

Accordingly, the distance between the vehicle and the traffic light decreases as illustrated by graph 202. At a point in time indicated by the dashed line 205, the vehicle reaches the traffic light, i.e. the distance between the vehicle and the approach traffic light becomes zero. As depicted, the vehicle reaches the traffic light during a green traffic light status 200 A. The expiration of a yellow traffic light status 200 B, i.e. the initiation of a red traffic light status 200 C, is indicated by dashed line 204 B.

From the moment of reception of the traffic light status information (indicated by dashed line 204 A) to the point in time when the vehicle passes the traffic light status in the green traffic light status 200 A, an optical indicator 203 B is provided indicating a possible passing of the vehicle during a non-red traffic light status. In the exemplary depiction, the optical indicator is color-coded green. However, any other color may be utilized. The optical indicator may, e.g. be provided by a display of the vehicle's human machine interface. However, the indicator 203 B may alternatively be an acoustic indicator, i.e. an audible tone provided by a speaker.

In summary, FIG. 2 depicts a situation, wherein the vehicle is enabled to pass the traffic light in a green traffic light status 200 A before the traffic light signals status switches to a red traffic light status 200 C. Particularly, information indicating duration and sequence of traffic light statuses is obtained by the apparatus 100. In accordance with the obtained information, the apparatus 100 determines a required driving profile comprising, e.g. a local speed limit, particular road geometry and vehicle trajectory, to enable an arrival of the vehicle at the traffic light during a passing status. If it is determined that an adaptation of the current driving conditions in accordance with additional conditions such as a local speed limit enables passing of the traffic light during, e.g. a green light phase the indicator 203 provides an optical signal 203 B as long an adaptation of the current driving conditions enables passing of the traffic light. Control of the vehicle can consequently be initiated to adapt the current driving conditions accordingly. In other words, kinematic variables such as velocity and/or acceleration can be changed in order to enable passing of the vehicle during a, e.g. green light phase of the traffic light.

Figure 3:
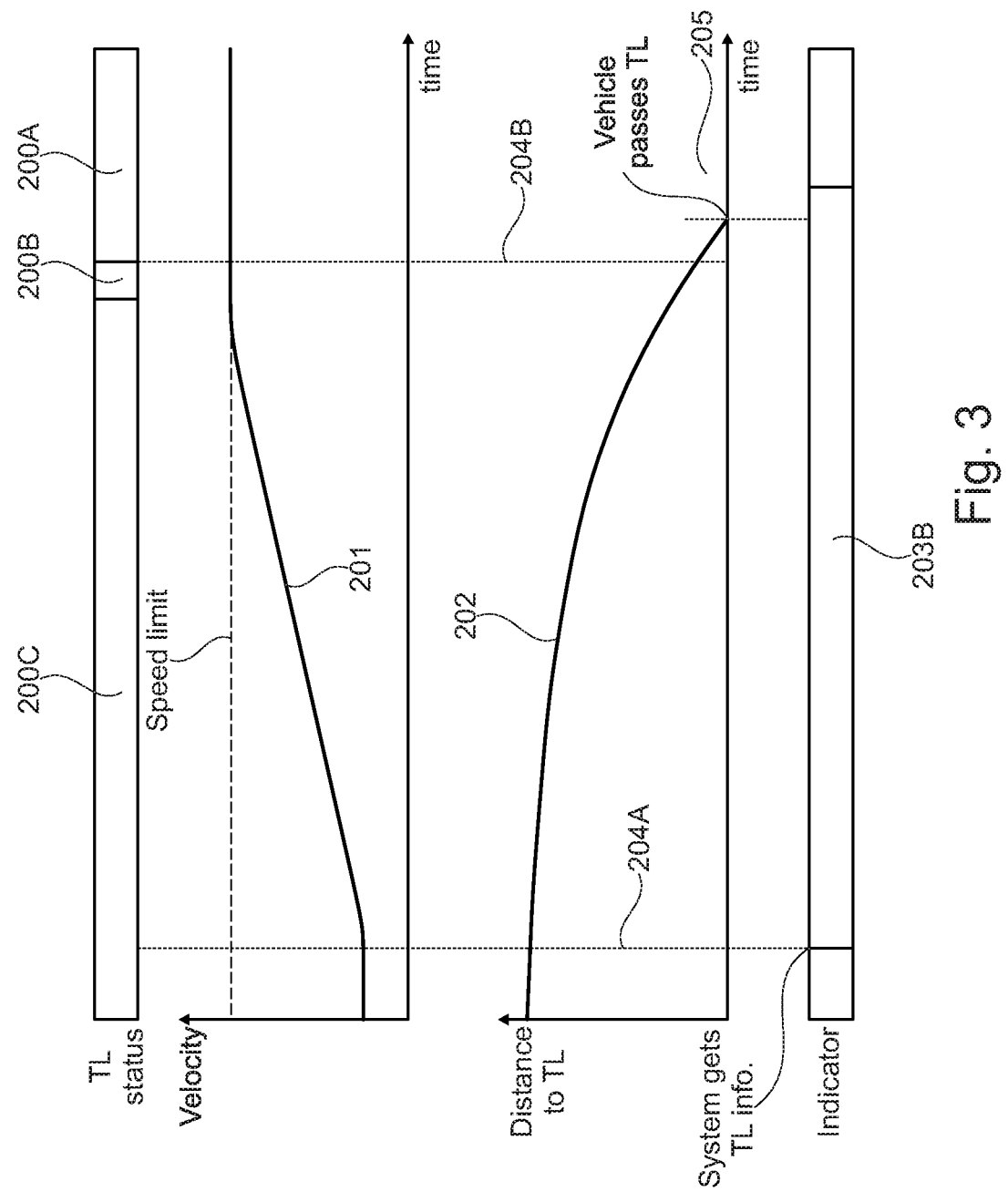
FIG. 3 depicts a situation a, wherein the vehicle is enabled to pass the traffic light in a green traffic light status when it is controlled that the vehicle speed increases according to first driving condition control settings

FIG. 3 depicts a similar situation compared with the discussed setup of FIG. 2. However, in FIG. 3 the apparatus 100 initially receives information from the traffic light indicating an current red traffic light status 200 C and its duration. This process is indicated by the dashed if line 204 A.

Based on information relating to a determined distance between the vehicle and the detected traffic light, as well as the current kinematic state of the vehicle, the apparatus 100 determines whether an adaptation of the current kinematic state of the vehicle enables the vehicle to pass during a non-red traffic light status. The apparatus 100 calculates that based upon an increase of vehicle velocity a passing of the traffic light can be achieved. Accordingly, the indicator 203 provides an optical "passing signal" during a duration for which passing of the traffic light during a non-red traffic light status (more specifically a green or yellow traffic light status) can be achieved, based upon an adaption of the current driving conditions within the thresholds of a predetermined acceleration and velocity profile, i.e. first driving condition control settings.

Accordingly, the velocity of the vehicle is controlled to be increased up to a predetermined speed limit as illustrated by graph 201. Consequently, the distance between the vehicle and the traffic light decreases as indicated by graph 202 and at a point in time indicated by dashed line 205 the vehicle passes the traffic light during a green traffic light status 200 A.

In summary, FIG. 3 depicts a situation, wherein it is optically indicated that the vehicle may pass the traffic light in a green traffic light status 200 A when vehicle speed is controlled to increase according to first driving condition control settings.

Figure 4:
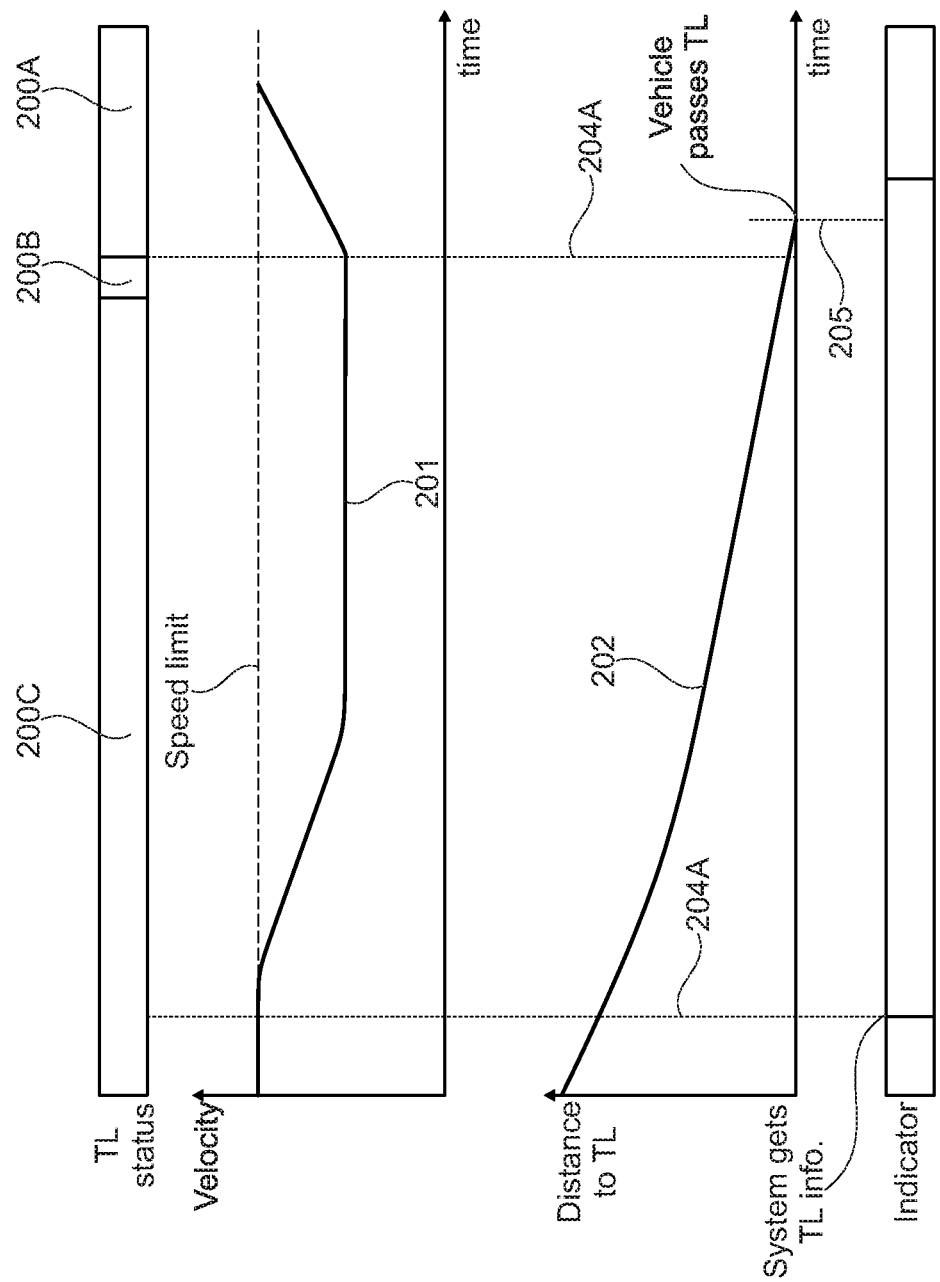
FIG. 4 depicts a situation, wherein the initial traffic light status is a stopping status.

FIG. 4 depicts a situation, wherein the initial traffic light status 200 is red. Information comprising geographic position of the traffic light, current traffic light status 200 as well as the duration of the current traffic light status 200 and subsequent traffic light statuses 200 B, 200 A is obtained by the vehicle, i.e. apparatus 100. In addition, velocity, acceleration and position of the vehicle are determined. Subsequently, the apparatus 100 determines whether the vehicle can pass the traffic light during a green traffic light status 200 A.

In particular, the apparatus 100 takes into account the respective durations of the red light phase 200 C and the yellow light phase 200 B and determines that a decrease of vehicle velocity enables passing of the traffic light during a green traffic light status 200 A. Consequently, at an instant indicated by dashed line 204 A the indicator 203 provides a green optical signal 203 B indicating that in accordance with an adaptation of the kinematic state of the vehicle passing of the traffic light is possible.

As indicated by graph 201 the vehicle speed is controlled to be decreased whereas the distance between the vehicle and traffic light decreases (see graph 202). Hence, before the vehicle arrives at the traffic light, the duration of the red light traffic status 200 C and the yellow traffic light status 200 B has elapsed (indicated by dashed line 204 A). Consequently, the vehicle passes the traffic light during a green traffic light status 200 A (indicated by dashed line 205).

In summary, it is determined and indicated that it is possible to "sit out" the duration of the red light traffic light status 200 C utilizing a controlled decrease of vehicle velocity according to first driving condition control settings. Accordingly, the kinematic state of the vehicle can be controlled to be adapted in accordance with predetermined acceleration and speed thresholds, which enables the vehicle to pass the traffic light during a passing status.

FIG. 5 displays a situation, wherein the traffic light is initially in a green traffic light status 200 A. Information relating to a current traffic status (green) as well its duration is obtained by apparatus 100 as indicated by dashed line 204 A. For example, the traffic light may be configured to send information concerning its geographic position as well as traffic light status information. Analogously, the apparatus 100 can be configured to receive such signals from a traffic light.

Based upon the current kinematic state, i.e. velocity vector and acceleration of the vehicle, as well as the distance between the vehicle and the traffic light, the apparatus 100 determines whether it is possible for the vehicle to pass the traffic light within the current green traffic light status 200 A.

More specifically, the apparatus 100 for controlling the automated vehicle estimates a passing possibility of the traffic light within the current green traffic light status 200 A, based upon first and second driving condition control settings. The first driving condition control settings can be characterized by thresholds for kinematic quantities such as a maximum speed and a maximum acceleration of the vehicle. In other words, the first driving condition control settings require that the kinematic state of the vehicle has to be adapted within the determined thresholds for vehicle speed and acceleration. Accordingly, the second driving condition control settings can be characterized by exceeding at least one of the predetermined thresholds of the first driving condition control settings, i.e. by a more "sporty" driving behavior of the vehicle.

The apparatus 100 for controlling the automated vehicle determines that utilization of the first driving condition control settings will not be sufficient in order to enable passing of the vehicle during the green traffic light status 200 A. This is reflected in graph 201 of FIG. 5, wherein the velocity profile (graph 201) shows an increase of the initial vehicle velocity up to a plateau velocity followed by a decrease to zero velocity, which corresponds to stopping the vehicle in front of the traffic light during a red light status 200 C (see zero points of graph 201 and graph 202 respectively, also marked by dashed line 204 C). Consequently, the optical indicator 203 outputs an optical signal 203 A indicating, that according to first driving condition control settings passing of the traffic light will not be possible.

However, simultaneously the apparatus 100 for controlling the automatic vehicle determines that an adaptation of the current kinematic vehicle states according to second driving condition control settings, i.e. a more "sporty" driving approach would enable the vehicle to pass the traffic light in a green traffic light status 200 A.

In particular, a higher acceleration value (higher than the maximum acceleration value permitted according to first driving condition control settings) causes the vehicle speed to increase up to a sufficient level enabling arrival at the traffic light during a green traffic light status 200 A. This is illustrated by graph 201 A, wherein the vehicle velocity is increased within a time interval defined by dashed line 204 A and dashed line 204 B. The aforementioned time interval represents a "window of opportunity" for which the vehicle can pass the traffic light in a green light traffic light status 200 A, if an adaptation of the automatic vehicle state according to second driving condition control settings is applied. In other words, the apparatus 100 determines a time interval during which a more "sporty" driving behavior (i.e. more drastic velocity change and/or acceleration change maneuvers than permitted according to first driving condition control settings) enables passing of the traffic light and provides an optical signal 203 C conveying this information. After elapsing of the aforementioned time interval it is no longer possible to reach the traffic light during a green traffic light status 200 A, even if the kinematic parameters of the vehicle are controlled in accordance with the second driving condition control settings, i.e. a more "sporty" driving behavior. This is indicated by the signal 203 D.

In addition, indicator 203 can provide an optical signal 203 C conveying information that passing of the traffic light during a passing status is possible, if the kinematic vehicle state is adapted according to second driving control conditions, i.e. more drastic changes of velocity and/or acceleration then an adaptation according to first driving control conditions.

In other words, the duration of displaying the optical signal 203 C indicates "a window of opportunity" during which a passing of the traffic light is enabled if the vehicle undergoes an adaptation of velocity and/or acceleration in accordance with second driving condition control settings. In other words, the optical signal 203 C indicates a time interval during which a more "sporty" driving behavior enables passing of the traffic light during a passing status.

Accordingly, FIG. 5 shows that for the duration of an interval defined by dashed lines 204 A and 204 B an actual velocity increase is performed (depicted by graph 201 A). Consequently, this velocity change enables passing of the traffic lights during a green light phase.

Moreover, at a time indicated by dashed line 204 D the apparatus 100 determines that the vehicle will be able to pass the green traffic light according to the first driving condition control settings. In other words, the velocity increase performed during the time interval indicated by dashed lines 204 A and 204 D changes the kinematic vehicle state sufficiently such that it becomes possible to pass the traffic light during a passing status without further acceleration or velocity increase.

Consequently, the indicator 203 outputs a corresponding optical signal 203 B conveying the information that further acceleration or velocity increase is not necessary in order to pass the traffic light during a passing status. The driving conditions of the vehicle can be controlled accordingly resulting in a more comfortably, i.e. less "sporty" driving behavior. Eventually, a time indicated by dashed line 204 E the vehicle passes the traffic light in a green traffic light status.

In summary, FIG. 5 shows a situation, wherein a passing possibility, is estimated in accordance with a simultaneous consideration of kinematic state adaptations according to first and second driving condition control settings, and wherein corresponding time periods during which passing of the traffic light becomes possible are indicated by respective optical signals.

FIG. 6 exemplarily shows a schematic diagram of an apparatus 100 for controlling a vehicle according to some exemplary embodiments.

The apparatus 100 may include a traffic light detection unit 610 configured to scan for and detect traffic lights along the path or trajectory of the vehicle. In particular, the traffic light detection unit 610 may comprise a sensor phalanx 620. The sensor phalanx 620 may comprise a variety of multiple sensors configured for detection of traffic lights or other objects intersecting the vehicle trajectory. The sensor phalanx 620 may be arranged at the coachwork or autobody of the vehicle.

In particular, according to some exemplary embodiments the sensor phalanx may comprise sensors actively scanning for traffic lights in the proximity of the vehicle. Scanning for traffic lights may, for example, be performed via optical detection and analyzing means, i.e. camera systems. For example, such camera systems may be configured to record and analyze optical signals indicating traffic lights and/or other traffic participants. For example, a periodic change between a green, an amber (yellow) and a red light signal might indicate the existence of a traffic light in heading direction of the vehicle. In addition, the sensor phalanx 620 may also comprise one or multiple communication sensors configured to identify a traffic light based upon signals emitted by the traffic light. Moreover, a traffic light along the vehicle trajectory can be detected via a combination of actively scanning sensors such as an exemplary camera system and passively scanning sensors such as communication sensors sampling or scanning for signals indicating the existence of a traffic light.

The apparatus 600 may further comprise a traffic light status determination unit 630 configured to determine light phases of detected traffic lights. The traffic light status determination unit 630 may include sensors 640 capable of detecting current traffic light phases and determining respective durations of a current traffic light phase as well as subsequent traffic light phases. For example, information received via optical sensors, i.e. a camera system, can be analyzed with regard to duration and changing sequence of the detected color, i.e. frequency, of optical traffic light signals. Hence, duration of individual traffic light phases can be identified. Alternatively and/or auxiliary the traffic light status determination unit 630 may comprise a transceiver configured for direct communication with a detected traffic light. To this effect, information relating to current and future light phases and their duration may be directly exchanged between the apparatus for controlling the vehicle and a detected traffic light.

The apparatus 100 may further comprise an arrival time estimation unit 650. The arrival time estimation unit 650 may be configured to estimate arrival times of the vehicle at the detected traffic light. In particular, upon detection of approaching a traffic light, the arrival time estimation unit 650 may determine a current kinematic state of the vehicle. For example, the arrival time estimation unit 650 may comprise a kinematic state detection unit 660 configured to permanently monitor and/or determine a kinematic vehicle state. Alternatively, the kinematic state detection unit 660 may be configured to determine a kinematic state of the vehicle upon request. For example, detection of a traffic light might trigger or cause the kinematic state detection unit 662 to determine a current kinematic state, i.e. current velocity and current acceleration, of the vehicle.

The apparatus 600 may further comprise a trajectory determination unit 670 configured to estimate or determine vehicle trajectories based upon determined current driving conditions and adaptations of the current driving conditions. i.e. adapted kinematic vehicle states. In particular, the trajectory determination unit 670 may be configured to determine arrival times of the vehicle at the traffic light, based upon a determined driving distance between the vehicle and the detected traffic light, and in correspondence to current driving conditions as well as variations of the driving conditions representing adapted kinematic states of the vehicle. The driving distance may be determined utilizing a variety of distance measuring devices, such as GPS or laser distance measuring systems, which may be comprised by the sensor phalanx 620 of the apparatus for controlling a vehicle 100.

Hence, the arrival time estimation unit 650 may be configured to estimate a first arrival time of the vehicle at the detected traffic light based on a determined current kinematic state of the vehicle. Moreover, the arrival time estimation unit 650 may further be configured to estimate a second arrival time of the vehicle based on an adapted kinematic state of the vehicle corresponding to a change of the current driving conditions.

As further indicated in FIG. 6, the traffic light detection unit 610, the traffic light status determination unit 630, the arrival time estimation unit 650 as well as their respective sub constituents, i.e. subcomponents, may be integrated within input unit 101.

The apparatus 100 may further comprise a processing unit 680 configured to estimate or calculate whether the vehicle can pass the traffic light during a passing status of the traffic light. Specifically, the processing unit 680 may comprise a first calculation unit 103 and a second calculation unit 104. The first calculation unit 103 may be configured to calculate whether the vehicle can pass the traffic light based on the current driving conditions of the vehicle. In particular, the first calculation unit 103 may be configured to take into account information relating to a determined traffic light status at an arrival time of the vehicle under the assumption of a kinematic state that corresponds to the determined current driving conditions. In other words, the first calculation unit 103 may be configured to calculate whether the traffic light will be in a passing status when the vehicle travels the distance towards the detected traffic light in accordance with current driving conditions of the vehicle. Consequently, the first calculation unit 103 may utilize information and/or data provided by at least one of the traffic light detection unit 610, the traffic light status determination unit 630 and the arrival time estimation unit 650 or a combination thereof.

In analogy, the second calculation unit 104 may be configured to calculate whether the vehicle can arrive at the second estimated arrival time during a passing status of the traffic light if a change of the kinematic state representing the current driving conditions is performed. The second calculation unit 104 may perform the calculation based upon data provided by at least one of the traffic light detection unit 610, the traffic light status determination unit 630 and the arrival time estimation unit 650 or a combination thereof.

For this purpose, the second calculation unit 104 may be further configured to perform calculations involving a variety of adaptations of the current driving conditions of the vehicle in accordance with a determined current traffic light status and an estimate concerning sequence and duration of future traffic light statuses.

The apparatus 100 may further comprise a merger or comparator unit 105, which compares the output of first calculation unit 103 and the second calculation unit 104. Accordingly, if it is determined that the vehicle can reach the traffic light during a passing status based upon current driving conditions a corresponding signal is provided via a human machine interface 691. For example, a color-coded optical signal indicating a passing possibility according to current driving conditions may be provided via a display of a human machine interface 691. If it is determined that the vehicle can reach the traffic light during a passing status only based upon adaptations of the current driving conditions another color-coded optical signal may be provided by the display of the human machine interface 691. Specifically, if it is further determined that in order to arrive at the traffic light during a passing status it is necessary to adapt the current driving conditions according to change of the vehicle velocity and/or acceleration that might be perceived by a vehicle driver as uncomfortable, yet another color-coded optical signal may be provided via the human machine interface.

In accordance with the provided color-coded signals that indicate passing possibility of the traffic light according to respective adaptations of driving conditions, kinematic parameters such as acceleration and/or velocity of the vehicle may be adjusted.

For example, such an adjustment can be performed in accordance with instructions received from a control unit 692, that is controlled to automatically control the vehicle. Alternatively, an adjustment of the kinematic vehicle state may be merely achieved via overriding of a vehicle driver, i.e. by activating brake and flash or gas pedal of the vehicle.

FIG. 7 exemplary illustrates a method for controlling a vehicle according to some exemplary embodiments.

The exemplary process of FIG. 7 includes an initializing or starting step 700 for launching the vehicle control method. The starting step 700 may either be automatically performed or commenced when starting the vehicle or upon request while driving.

The exemplary process of FIG. 7 includes a step 710 of determining, whether the vehicle is approaching a traffic light. Herein, the term "determining" may represent an active scanning process for traffic lights along the vehicle trajectory or vehicle path. For example, a camera system of the vehicle may provide optical information indicating a presence of a traffic tight along the vehicle trajectory.

Alternatively, information regarding the presence and/or position of a traffic light along the vehicle path may be submitted by a traffic light and subsequently received by corresponding sensors comprised by the vehicle.

If its determined in step 710 that the vehicle is not approaching a traffic light, the traffic light identifying process may be continued for a predetermined time period or indefinitely until the vehicle reaches its destination.

If it is determined in step 710 that the vehicle is approaching a traffic light, a first arrival time calculation step 720 *a* and a second arrival time calculation step 720 *b* are launched simultaneously and performed in parallel.

Herein, is the first arrival time calculation step 720 *a* based on current driving conditions of the vehicle. To be more precise, a first arrival time of the vehicle at the detected traffic light is determined by taking into account a current kinematic state of the vehicle. In other words, after determination of the current kinematic vehicle state, i.e. position, velocity and/or acceleration of the vehicle, a first arrival time of the vehicle at the traffic light is determined in accordance with input data corresponding to the determined kinematic state of the vehicle.

Analogously, the second arrival time calculation step 720 *b* is based on an adaptation of the current kinematic vehicle state. In particular, such an adapted kinematic state may be selected out of a predetermined range of kinematic states corresponding to a variety of velocity and/or acceleration value ranges. To be more specific, a first set or range of allowed velocity and/or acceleration values may correspond to a first adapted vehicle state, and a second set or range of velocity and/or acceleration values may correspond to a second adapted vehicle state. In addition, the second adapted vehicle state may also be defined in relation to the first adapted kinematic vehicle state. Specifically, the second adapted vehicle state may be defined such that an exceedance of one or more of the predetermined values characterizing the first kinematic state may define the second adapted vehicle state.

Hence, according to step 720 *b* a second arrival time of the vehicle at the traffic light may be calculated in accordance to an adaptation of the current driving conditions. For example, a velocity change or acceleration change might result in an increase of speed and/or increase of acceleration of the vehicle. Alternatively, the velocity change or acceleration change might result in a decrease of speed and/or decrease of acceleration of the vehicle. Velocity and/or acceleration of the vehicle may be defined in relation to a fixed frame of reference external to the vehicle.

After a first arrival time has been calculated based on a current driving state of the vehicle, it is determined in step 730 *a* which traffic light status the traffic light will be exhibited, when the vehicle arrives at the traffic light at the estimated first arrival time. For example, the step of traffic light determination 730 *a* may comprise a monitoring step of the individual traffic light phases and their duration, respectively. Such a monitoring step may be performed using a camera system, wherein information regarding individual traffic light statuses or phases and their respective duration may be indicated utilizing frequency changes of the emitted visible light of the traffic light. For example, when a traffic light switches from a red light phase to a green light phase the change of color may indicate switching of the traffic light status. Alternatively, information relating to current and future traffic light statuses of the traffic light may be continuously broadcast or transmitted by the traffic light. Accordingly, these signals may be received by reception means comprised by the vehicle.

In preferred embodiments, parallel to the determination step 730 *a* it is determined in a determination step 730 *b* which traffic light status will be exhibited by the traffic light at the second arrival time of the vehicle. In other words, determination step 730 *b* calculates or estimates the particular traffic light phase at the estimated arrival time of the vehicle at the traffic light, which is based upon an adaptation of the kinematic vehicle state. The adaptation of the kinematic vehicle state may be in accordance with a range of predetermined kinematic vehicle states. In other words, an adaptation of the current kinematic vehicle state might comprise changing acceleration and/or velocity values according to respective predefined value intervals.

Hence, a particular traffic light status is determined taking into account a predetermined increase or decrease of velocity and/or a predetermined increase or decrease of acceleration of the vehicle.

In preferred embodiments, subsequently to the determination steps 730 *a* and 730 *b*, it may be determined in a calculation step 740, whether the vehicle can pass the traffic light in a passing status at the first arrival time in accordance with the current kinematic vehicle state, i.e. current driving conditions, or at the second arrival time in accordance with adapted driving conditions, i.e an adapted kinematic state of the vehicle in accordance with predetermined changes of kinematic variables, such as velocity and/or acceleration of the vehicle.

In some embodiments, when it is determined in step 740 that the vehicle can pass the traffic light in a passing status in accordance with current driving conditions, a corresponding first signal is provided in step 750 *a*, indicating that the kinematic vehicle state does not need to be changed for enabling the vehicle to pass the traffic light during a passing status. The human machine interface may enable a vehicle driver to access the information whether the vehicle can arrive at the traffic light during a passing status, i.e. a green and/or yellow or (amber) phase of the traffic light.

When it is determined in step 740, that the vehicle will not arrive at the traffic light during a passing status according to current driving conditions but may be enabled to arrive at the traffic lights during a passing status at a second arrival time when the kinematic state of the vehicle is adapted in accordance with predetermined first control driving conditions, a corresponding second signal is provided in step 750 *b*.

Hence, vehicle control in accordance with the provided second signal may be performed and the kinematic state of the vehicle may be adapted according to first control driving conditions. For example, manual override by a vehicle driver may be performed. Alternatively, autonomous vehicle control may be performed in accordance with predefined first control driving conditions.

An adaptation of the kinematic vehicle state may comprise an increase or decrease of velocity via an increase or decrease of acceleration or a combination thereof.

Moreover, if it is determined in step 740 that the vehicle may only arrive at the second arrival time at the traffic light in accordance with a drastic change of current driving conditions, i.e. a more "sporty" driving behavior, a corresponding third signal may be provided. In particular, "sporty driving" may be defined in accordance with a set of first and/or second driving condition control settings. In particular, the driving condition control settings may correspond to a set of machine-readable information, e.g. represented by binary coded instructions, which allow control of the kinematic vehicle state. Hence, first driving condition control settings may enable control of a predetermined set of kinematic parameters such as velocity and/or acceleration. For example, a set of predetermined vehicle acceleration and/or velocity values may be chosen corresponding to a "comfortable" driving experience. In correspondence, the second driving condition control settings may correspond to an exceedance of one or more of the values controlled according to the first driving condition control settings.

Accordingly, when it is determined in step 740 that the vehicle can neither arrive at the traffic light during a passing status in accordance with current control conditions nor an adaptation of the kinematic vehicle state in accordance with predefined first driving condition control settings, but that the vehicle may arrive at the traffic light during a passing status when the kinematic vehicle state is adapted according to second driving condition control settings, the corresponding third signal is provided in step 750 *c*.

Hence, vehicle control in accordance with the provided third signal may be performed and the kinematic state of the vehicle may be adapted according to second control driving conditions to enable the vehicle to pass the traffic light during a passing status. For example, manual override by a vehicle driver may be performed. Alternatively, autonomous vehicle control may be performed in accordance with predefined second control driving conditions.

When it is determined that the vehicle cannot arrive at a passing status of the traffic light at the first or second arrival time, a corresponding fourth signal is provided in step 750 *d*. Consequently, vehicle control in accordance with the provided fourth signal may be performed. In particular, the vehicle can be controlled in order to stop at the traffic light during a non-passing status of the traffic light. For example, manual override by a vehicle driver may be performed to halt the vehicle. Alternatively, autonomous vehicle controlled may cause the vehicle to stop at the traffic light during a passing status.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

As will be appreciated by one of skill in the art, aspects and exemplary embodiments, as described hereinabove and in connection with the accompanying figures, may be embodied as a method for controlling a vehicle (e.g., a computer-implemented process), apparatus for controlling a vehicle (including a device, machine, system, computer program product, and/or any other apparatus), or a combination of the foregoing. Embodiments of the present invention may take the form of a computer program product for controlling a vehicle on a computer-readable medium having computer-executable program code embodied in the medium.

Embodiments are described exemplarily hereinabove with reference to flowchart illustrations and/or block diagrams of the method and apparatus for controlling a vehicle, and with reference to a number of sample views of a graphical user interface generated by the method and/or apparatus for controlling a vehicle. It will be understood that each block of the flowchart illustration and/or block diagrams, and/or combinations of blocks in the flowchart illustrations and/or block diagrams, as well as the graphical user interface, can be implemented by computer-executable program code for semi-automatic or automatic vehicle control.

The computer-executable program code may be provided to a processor of a general purpose computer, special purpose computer (vehicle controller), or other programmable data processing apparatus to produce a particular machine, such that the program code, which executes via the processor of the computer or other programmable data processing apparatus, generate means for implementing the functions/acts/outputs specified in the flowchart, block diagram block or blocks, figures, and/or written description.

These computer-executable program code may also be stored in a computer-readable memory that can direct a vehicle controller or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer for vehicle control or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

It should also be noted that the apparatus for vehicle control may use communication protocols and messages (e.g., messages generated, transmitted, received, stored, and/or processed by the apparatus for vehicle control), and such messages may be conveyed by a communication network or medium.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter, or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the internet or World Wide Web). Of course, some embodiments of the invention may be implemented as a combination of both software (e.g. a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

The invention claimed is:

1. An apparatus for controlling a vehicle, comprising:
a traffic light detection means configured to determine whether the vehicle is approaching a traffic light,
an arrival time estimation means configured to estimate, when the vehicle is detected to approach a traffic light, a first arrival time of the vehicle at the traffic light based on current driving conditions and a second arrival time of the vehicle at the traffic light based on adapted driving conditions different from the current driving conditions,
a traffic light status determination means configured to determine a traffic light status of the traffic light at the first and second arrival times, the traffic light status being a passing status allowing the vehicle to pass the traffic light or a stopping status requiring the vehicle to stop at the traffic light,
a processing means configured to calculate whether the vehicle can pass the traffic light based on the current driving conditions of the vehicle based on a determination whether the traffic light has a passing status at the estimated first arrival time and to calculate whether the vehicle can pass the traffic light based on the adapted driving conditions of the vehicle based on a determination whether the traffic light has a passing status at the estimated second arrival time, and
a control means configured to control at least one of a driving direction of the vehicle, a speed of the vehicle and/or an acceleration of the vehicle based on first driving condition control settings; wherein, the control means is configured to adapt the current driving conditions of the vehicle based on the first driving condition control settings, if the processing means determined that the vehicle can pass the traffic light during the passing status when being controlled based on the first driving condition control settings, so as to pass the traffic light by control based on the first driving condition control settings, wherein the processing means is further configured, upon detection of the vehicle approaching the traffic light, to determine:

whether the vehicle can pass the traffic light during the passing status at the estimated second arrival time when the current driving conditions are adapted based on first driving condition control settings, so as to pass the traffic light by control based on the first driving condition control settings and/or by manual override by a driver of the vehicle, or whether the vehicle can pass the traffic light during the passing status at the estimated second arrival time when the current driving conditions are adapted being controlled based on second driving condition control settings, so as to pass the traffic light by control based on the second driving condition control settings and/or by manual override by a driver of the vehicle, and wherein the first and/or second driving condition control settings define one or more control parameters for controlling the vehicle including a maximum lateral acceleration of the vehicle.

2. The apparatus according to claim 1, wherein
the control means is configured to adapt the current driving conditions of the vehicle based on the second driving condition control settings, if the processing means determined that the vehicle cannot pass the traffic light during the passing status at the estimated second arrival time when being controlled based on the first driving condition control settings but can pass the traffic light during the passing status at the estimated second arrival time when being controlled based on the second driving condition control settings, so as to pass the traffic light by control based on the second driving condition control settings.

3. The apparatus according to claim 1, wherein
the first and/or second driving condition control settings further define one or more control parameters for controlling the vehicle including at least one of a maximal positive longitudinal acceleration of the vehicle, a minimal negative longitudinal acceleration of the vehicle, and a maximal speed of the vehicle.

4. The apparatus according to claim 3, wherein none of the control parameters will be exceeded when it is determined that the vehicle is being controlled based on the first driving condition control settings.

5. The apparatus according to claim 3, wherein at least one of the control parameters will be exceeded when it is determined that the vehicle is being controlled based on the second driving condition control settings.

6. The apparatus according to claim 1, further comprising:
a human machine interface configured to output a first signal to the driver of the vehicle if it is determined that the vehicle can pass the traffic light by manual operation of the driver of the vehicle based on adapted driving conditions based on the first driving condition control settings and to output a second signal to the driver of the vehicle if it is determined that the vehicle can pass the traffic light based on adapted driving conditions based on the second driving condition control settings.

7. An apparatus for controlling a vehicle, comprising:
a traffic light detection means configured to determine whether the vehicle is approaching a traffic light;
an arrival time estimation means configured to estimate, when the vehicle is detected to approach a traffic light, a first arrival time of the vehicle at the traffic light based on current driving conditions and a second arrival time of the vehicle at the traffic light based on adapted driving conditions different from the current driving conditions;
a traffic light status determination means configured to determine a traffic light status of the traffic light at the first and second arrival times, the traffic light status being a passing status allowing the vehicle to pass the traffic light or a stopping status requiring the vehicle to stop at the traffic light;
a processing means configured to calculate whether the vehicle can pass the traffic light based on the current driving conditions of the vehicle based on a determination whether the traffic light has a passing status at the estimated first arrival time and to calculate whether the vehicle can pass the traffic light based on the adapted driving conditions of the vehicle based on a determination whether the traffic light has a passing status at the estimated second arrival time; and
a human machine interface configured to output a first signal to the driver of the vehicle if it is determined that the vehicle can pass the traffic light by manual operation of the driver of the vehicle based on adapted driving conditions based on the first driving condition control settings and to output a second signal to the driver of the vehicle if it is determined that the vehicle can pass the traffic light based on adapted driving conditions based on the second driving condition control settings;

wherein the processing means is further configured, upon detection of the vehicle approaching the traffic light, to determine:

whether the vehicle can pass the traffic light during the passing status at the estimated second arrival time when the current driving conditions are adapted based on first driving condition control settings, so as to pass the traffic light by control based on the first driving condition control settings and/or by manual override by a driver of the vehicle, or whether the vehicle can pass the traffic light during the passing status at the estimated second arrival time when the current driving conditions are adapted being controlled based on second driving condition control settings, so as to pass the traffic light by control based on the second driving condition control settings and/or by manual override by a driver of the vehicle; and wherein the processing means determines a time period during which adapted driving conditions based on the second driving condition control settings by manual override by a driver of the vehicle enables the vehicle to pass the traffic light during a passing status, and wherein the human machine interface is further configured to output the second signal for the duration of the time period and to output a third signal to the driver of the vehicle after elapsing of the time period indicating that passing of the traffic light by manual override by the driver based on the second driving condition control settings does not further enable the vehicle to pass the traffic light.

8. The apparatus according to claim 6, wherein the determination, whether the vehicle can pass the traffic light during a passing status by manual override by the driver of the vehicle based on the second driving condition control settings, is based on a speed limit.

9. The apparatus according to claim 1, wherein a communication means is being configured to communicably connect with a communication means of the traffic light to obtain traffic light status information, wherein the traffic light status of the traffic light at the estimated first or second arrival time and/or the duration until a time of switching of a traffic light status of the traffic light is determined based on the obtained traffic light status information.

10. The apparatus according to claim 9, wherein the determination, whether the vehicle can pass the traffic light during a passing status when being controlled based on respective driving condition control settings, is further performed in accordance with a determination of positions and/or velocities of other vehicles arranged ahead of the vehicle.

11. The apparatus according to claim 9, wherein determination of traffic light position, vehicle position and/or other vehicle positions is based upon data provided by at least one out of a camera, a laser distance measuring device, a global positioning system or a vehicle-traffic light communication network.

12. A method for controlling a vehicle, comprising:
determining, whether the vehicle is approaching a traffic light,
estimating, when the vehicle is detected approaching a traffic light, a first arrival time of the vehicle at the traffic light based on current driving conditions and a second arrival time of the vehicle at the traffic light based on adapted driving conditions different from the current driving conditions,
determining a traffic light status of the traffic light at the first and second arrival times, the traffic light status being a passing status allowing the vehicle to pass the traffic light or a stopping status requiring the vehicle to stop at the traffic light,
calculating, whether the vehicle can pass the traffic light based on the current driving conditions of the vehicle based on a determination whether the traffic light has a passing status at the estimated first arrival time and calculating whether the vehicle can pass the traffic light based on the adapted driving conditions of the vehicle based on a determination whether the traffic light has a passing status at the estimated second arrival time,
controlling at least one of a driving direction of the vehicle, a speed of the vehicle and/or an acceleration of the vehicle based on first driving condition control settings,
adapting the current driving conditions of the vehicle based on the first driving condition control settings, if it is determined that the vehicle can pass the traffic light during the passing status when being controlled based on the first driving condition control settings, so as to pass the traffic light by control based on the first driving condition control settings, and
determining whether the vehicle can pass the traffic light during the passing status at the estimated second arrival time when the current driving conditions are adapted based on first driving condition control settings, so as to pass the traffic light by control based on the first driving condition control settings and/or by manual override by a driver of the vehicle, or whether the vehicle can pass the traffic light during the passing status at the estimated second arrival time when the current driving conditions are adapted being controlled based on second driving condition control settings, so as to pass the traffic light by control based on the second driving condition control settings and/or by manual override by a driver of the vehicle,
wherein the first and/or second driving condition control settings define one or more control parameters for controlling the vehicle including a maximum lateral acceleration of the vehicle.

13. A non-transitory computer-readable medium storing a program including computer-readable instructions which, when loaded to a controller of an apparatus for controlling a vehicle, are configured to cause the controller to execute a method according to claim 12.

* * * * *